(12) United States Patent
Bonin et al.

(10) Patent No.: US 7,126,792 B2
(45) Date of Patent: Oct. 24, 2006

(54) SLIDER FOR A DATA STORAGE DEVICE INCLUDING TRANSDUCER LEVEL MICRO-POSITIONING AND METHOD OF FABRICATION THEREFOR

(75) Inventors: Wayne A. Bonin, North Oaks, MN (US); Roger L. Hipwell, Jr., Eden Prairie, MN (US); John J. Pendray, Edina, MN (US); Kyle M. Bartholomew, St. Louis Park, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 300 days.

(21) Appl. No.: 10/286,652

(22) Filed: Nov. 1, 2002

(65) Prior Publication Data

US 2003/0161071 A1 Aug. 28, 2003

Related U.S. Application Data

(60) Provisional application No. 60/360,599, filed on Feb. 27, 2002, provisional application No. 60/360,650, filed on Feb. 27, 2002.

(51) Int. Cl.
G11B 21/20 (2006.01)
G11B 5/54 (2006.01)
G11B 7/09 (2006.01)

(52) U.S. Cl. .................................. 360/234.7
(58) Field of Classification Search ............. 360/234.7, 360/294.4, 294.7, 294.3, 294.2, 294.1
See application file for complete search history.

(56) References Cited

U.S. PATENT DOCUMENTS

| | | | | |
|---|---|---|---|---|
| 3,201,526 A | * | 8/1965 | Koorneef et al. | 360/75 |
| 4,605,977 A | * | 8/1986 | Matthews | 360/234.7 |
| 5,055,731 A | * | 10/1991 | Nihei et al. | 310/309 |
| 5,223,998 A | * | 6/1993 | Tokuyama et al. | 360/234.7 |
| 5,801,472 A | * | 9/1998 | Wada et al. | 310/309 |
| 5,856,896 A | * | 1/1999 | Berg et al. | 360/245.3 |
| 5,943,189 A | * | 8/1999 | Boutaghou et al. | 360/234.7 |
| 5,959,808 A | * | 9/1999 | Fan et al. | 360/294.3 |
| 5,991,113 A | * | 11/1999 | Meyer et al. | 360/75 |
| 6,069,769 A | * | 5/2000 | Dorius et al. | 360/235.6 |
| 6,181,531 B1 | | 1/2001 | Koshikawa et al. | 360/294.4 |
| 6,344,949 B1 | * | 2/2002 | Albrecht et al. | 360/236.5 |

(Continued)

FOREIGN PATENT DOCUMENTS

EP 0 242 597 A2 * 10/1987

OTHER PUBLICATIONS

"A Microactuator for Head Positioning System of Hard Disk Drives" by H. Fujita et al., for *IEEE Transactions on Magnetics*, vol. 35, No. 2, Mar. 1999.

*Primary Examiner*—William Korjurl
*Assistant Examiner*—Christopher R. Magee
(74) *Attorney, Agent, or Firm*—Westman, Champlin & Kelly, P.A.

(57) ABSTRACT

A head having micro-positioning control. The head includes a slider body and a transducer body coupled to the slider body through a flexible interface. The transducer body is spaced from the slider body to form a gap therebetween. Micro-positioning actuators are coupled to the transducer body in the gap to provide micro-positioning control. In an embodiment for an air bearing slider, the gap includes off-track and fly height positioning control.

21 Claims, 24 Drawing Sheets

U.S. PATENT DOCUMENTS 6,580,687 B1 * 6/2003 Cumpson et al. ........ 360/294.4
6,690,543 B1 * 2/2004 Kurita et al. ............ 360/294.7

2002/0075600 A1 6/2002 Schnur et al.

* cited by examiner

US 7,126,792 B2

SLIDER FOR A DATA STORAGE DEVICE INCLUDING TRANSDUCER LEVEL MICRO-POSITIONING AND METHOD OF FABRICATION THEREFOR

CROSS-REFERENCE TO RELATED APPLICATION

This application claims priority to U.S. Provisional Application Ser. No. 60/360,599 filed on Feb. 27, 2002 entitled "FABRICATION METHOD FOR A TRANSDUCER-LEVEL ELECTROSTATIC MICRO-ACTUATOR" and U.S. Provisional Application Ser. No. 60/360,650, filed on Feb. 27, 2002 and entitled "SLIDER WITH INDEPENDENTLY SUSPENDED TRANSDUCER".

FIELD OF THE INVENTION

The present invention relates generally to data storage devices and more particularly but not by limitation to a head for a data storage device.

BACKGROUND OF THE INVENTION

Data storage devices store digital information on a rotating disc. Heads are coupled to an actuator assembly which is energized to position the head relative to the disc surface for read/write operations. The head includes transducer elements to read data from or write data to the disc. A real density is increasing requiring increased positioning control for desired read-write resolution or operation. In particular, track density is increasing requiring greater off-track positioning control. For a head having an air bearing slider, head-disc spacing parameters are decreasing and track density is increasing requiring both off-track and fly height positioning control. Embodiments of the present invention provide solutions to these and other problems, and offer other advantages over the prior art.

SUMMARY OF THE INVENTION

The present invention relates to a head having micro-positioning control. The head includes a slider body and a transducer body coupled to the slider body through a flexible interface. The transducer body is spaced from the slider body to form a gap therebetween. Micro-positioning actuators are coupled to the transducer body in the gap to provide micro-positioning control. In an embodiment for an air bearing slider, the gap includes off-track and fly height positioning control. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
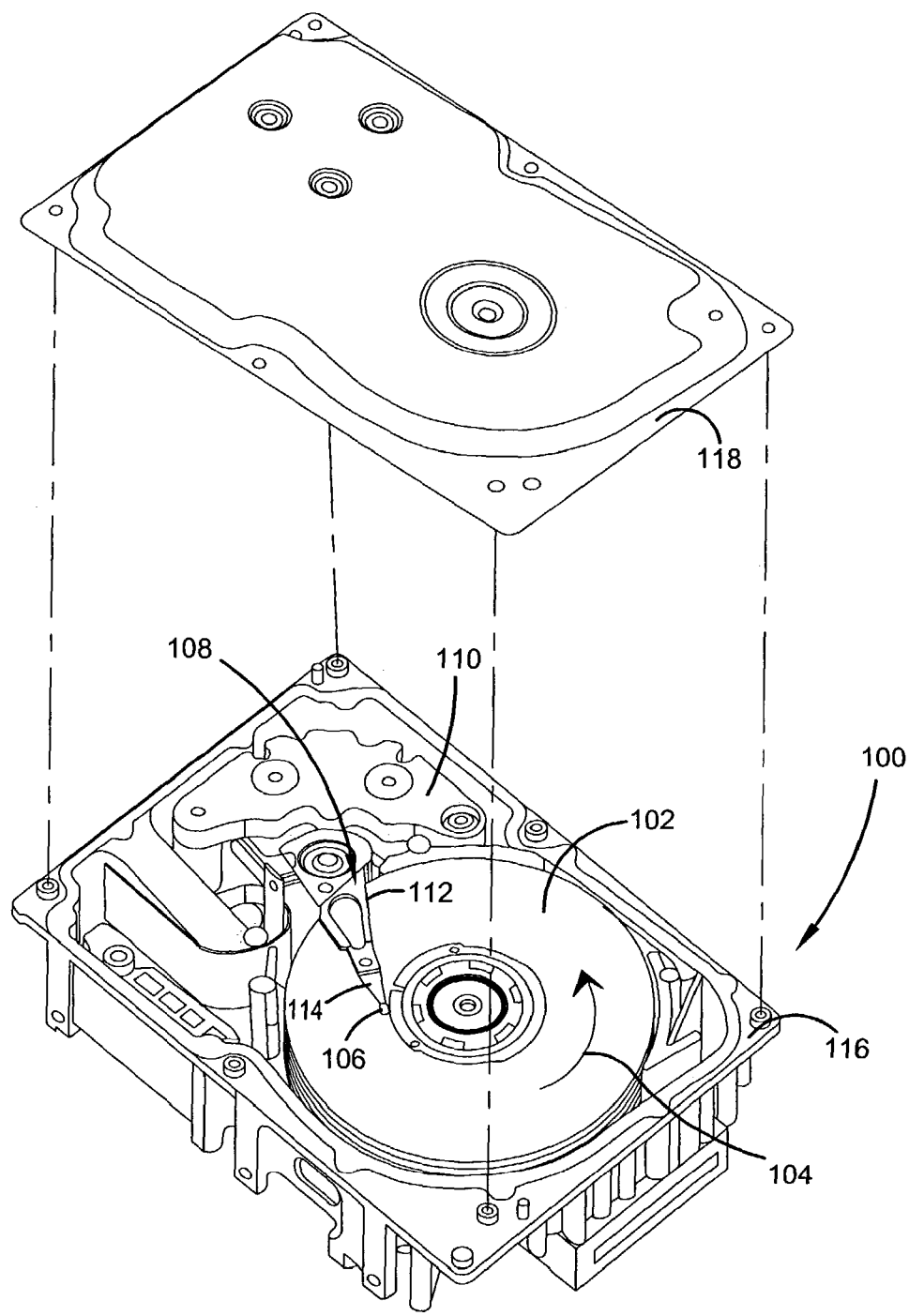
FIG. 1 is a perspective illustration of an embodiment of a data storage device.
Figure 2:
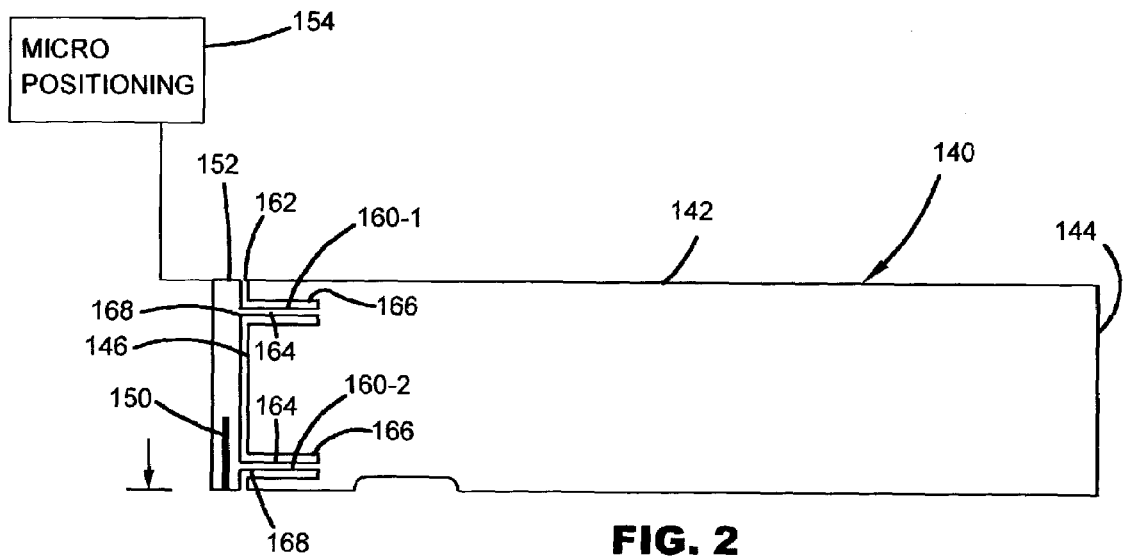
FIG. 2 is a schematic elevational illustration of an embodiment of a head including a slider body and a floating transducer body.
Figure 3:
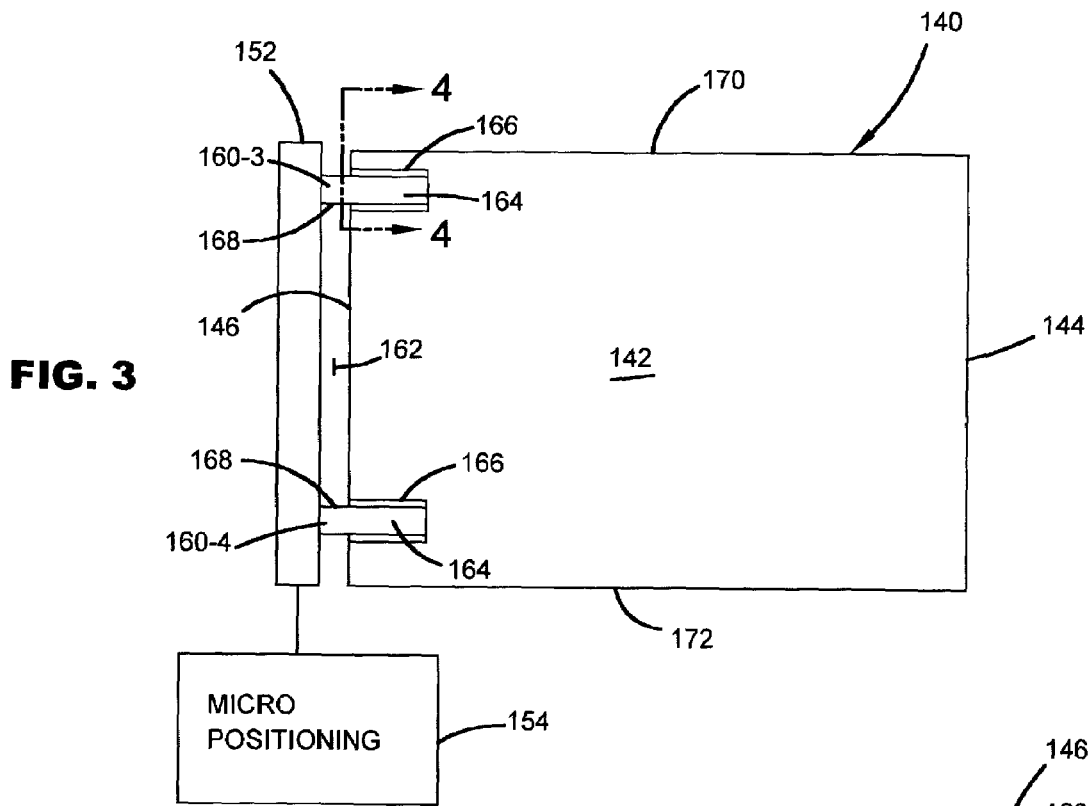
FIG. 3 is a plan illustration of an embodiment of a head including a slider body and a floating transducer body having transducer level micro-positioning.

FIG. 1 is a perspective illustration of a data storage device 100 in which embodiments of the present invention are useful. Device 100 includes a plurality of discs 102 supported for co-rotation as illustrated by arrow 104 by a spindle motor (not shown). Heads 106 are coupled to an actuator assembly 108 which is operated by a voice coil motor 110 to position the heads 106 for read-write operations. Heads 106 are coupled to arms 112 of the actuator assembly 108 via a suspension assembly 114 to allow the slider to pitch and roll relative to the disc surface. Components of the device 100 are coupled to a base chassis 116 and a cover 118 is secured to the base chassis 116 as schematically illustrated.

A real density is increasing requiring increased positioning control for desired read-write resolution or operation. In particular, track density is increasing requiring greater off-track positioning control. For a head having an air bearing slider, head-disc spacing parameters are decreasing and track density is increasing requiring both off-track and fly height positioning control. FIGS. 2–5 schematically illustrate an embodiment of a head 140 including a floating transducer body for transducer level micro-positioning control. As shown, head 140 includes a slider body 142 having a leading end 144, a trailing end 146 and transducer elements 150 encapsulated in transducer body 152. The transducer body 152 is flexibly coupled to the trailing end 146 of the slider body 142 through a flexible interface or flexible body. As schematically illustrated micro-positioning actuator 154 is coupled to the transducer body 152 and is energized to provide transducer level micro-positioning control.

Figure 4:
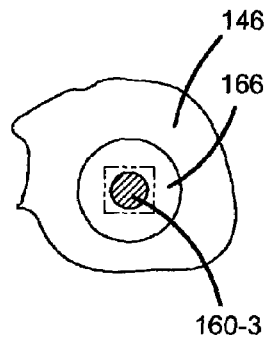
FIG. 4 is a cross-section view of a flexure body as taken along line 114 of FIG. 3.

In the embodiment illustrated in FIGS. 2–5, the flexible interface includes a plurality of flexure bodies 160. The transducer body is spaced from the slider body by a gap 162 and the flexure bodies 160 extend in the gap 162 between the slider body 142 and the transducer body 152. In the illustrated embodiment, the flexure bodies 160 include a first portion 164 extending in a trench 166 formed in the slider body 142 and a second portion 168 extending therefrom in gap 162 between the slider body 142 and the transducer body 152. In the illustrated embodiment, the flexible interface includes a plurality of elevationally spaced bodies 160-1, 160-2 and a plurality of laterally spaced bodies 160-3, 1604 between opposed sides 170, 172 of the slider body. As illustrated in FIG. 4, the flexible bodies can be formed of a cylindrical shape or alternatively a square or rectangular shape as illustrated by the dotted lines.

Figure 5:
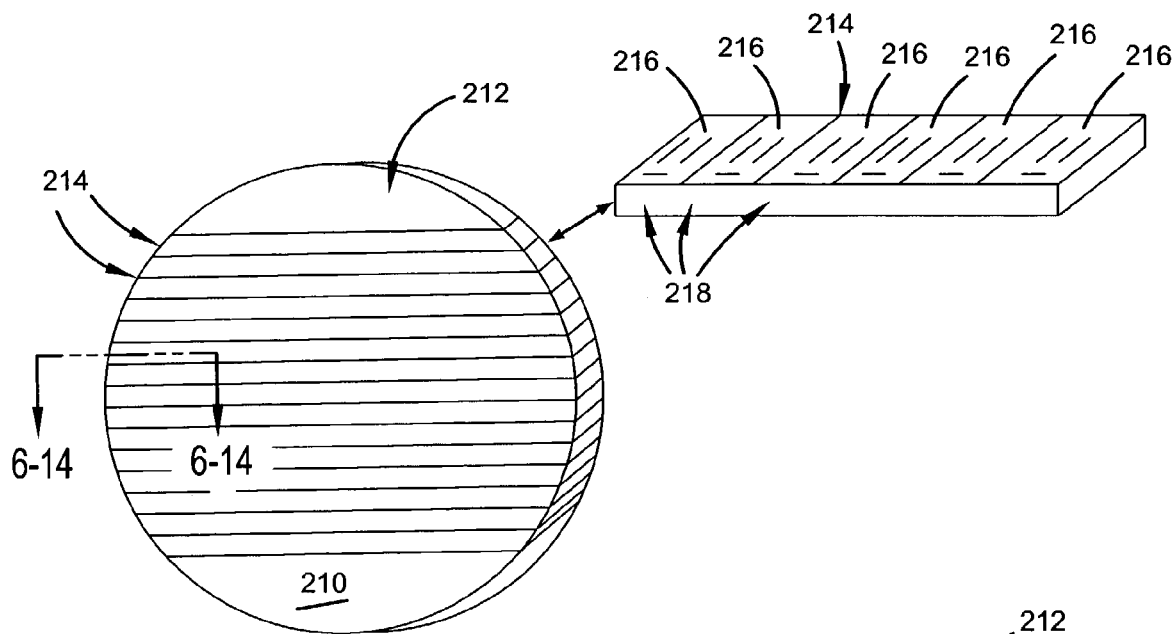
FIG. 5 schematically illustrates wafer fabrication of heads.

Heads 106 are typically formed by wafer fabrication processes as illustrated in FIG. 5. Transducer elements 150 are typically formed on surface 210 of a wafer 212. The wafer 212 is then sliced into a plurality of slider bars 214 and a plurality of air bearing surfaces 216 are formed along the slider bar 214 for air bearing sliders. Sliders 218 are sliced from the slider bar 214 to form heads for read-write operation. FIGS. 6–14 progressively illustrate a wafer fabrication embodiment for the transducer body and flexible interface or body in combination with wafer fabrication of transducer elements to provide transducer level micro-positioning control which can be wafer fabricated without complex processing steps.

Figure 7:
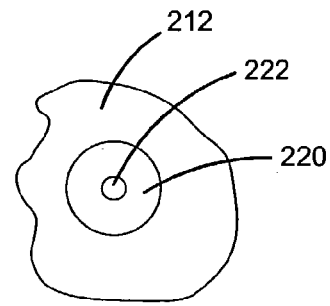
FIGS. 6–14 progressively illustrate an embodiment for wafer fabrication of a flexible interface between a slider body and a transducer body.
Figure 6:
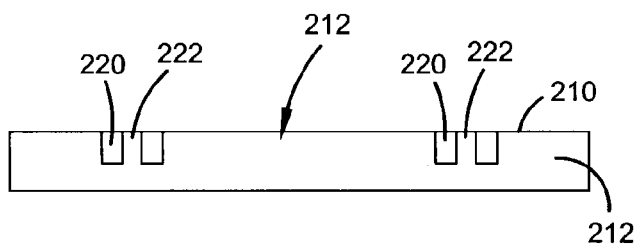
Figure 8:
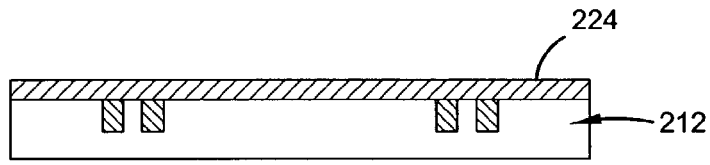
Figure 9:
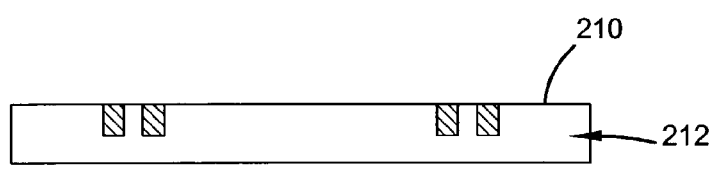

As shown in FIGS. 6–7, in the illustrated embodiment, flexure bodies are formed by etching a trench 220 having an unetched portion 222 in the trench 220 on the wafer surface 210. The trench 220 is etched using a deep reactive ion-etching process. A photoresist or oxide mask is used to pattern the trench 220. The unetched portion 222 in the trench 220 forms the first portion 164 of the flexible body or interface in trench 166. Preferably the wafer is formed of a silicon wafer. In the illustrated embodiment, the trench 220 is annular in shape, leaving unetched portion 222 to form a cylindrical shaped flexure body or interface. As illustrated in FIGS. 8–9, a sacrificial layer 224 is deposited on the wafer to fill trenches 220, and is planarized (for example using chemical mechanical polishing "CMP") as illustrated in FIG. 9 to remove any sacrificial material from the surface of the wafer, leaving the sacrificial material, such as LPCVD germanium, only in trenches 220. In a preferred embodiment, the sacrificial film 224 is deposited using a conformal deposition technique such as a low-pressure chemical vapor deposition ("LPCVD").

Figure 10:
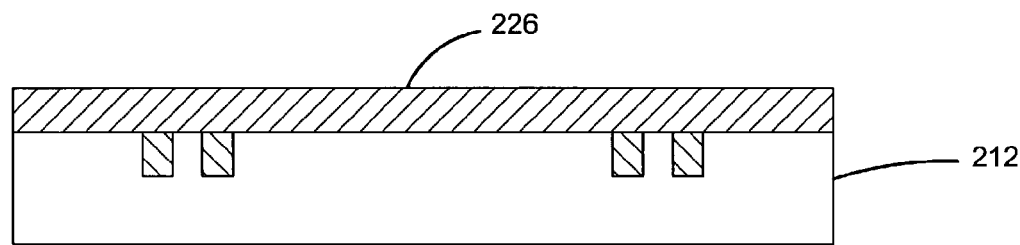
Figure 11:
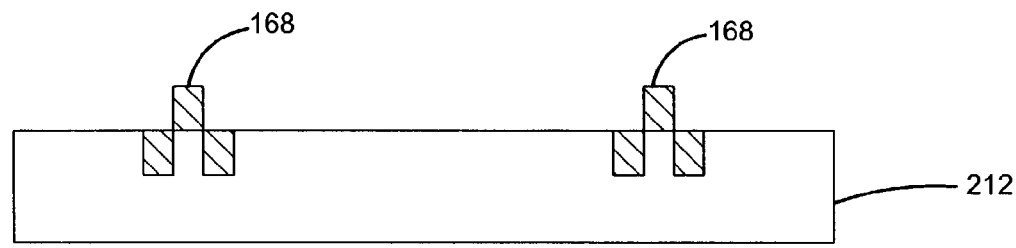
Figure 12:
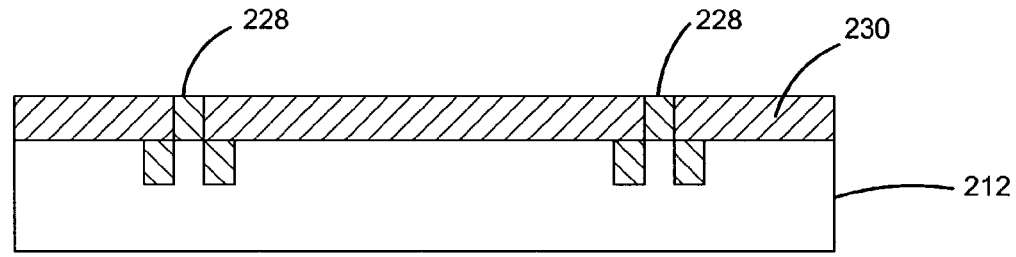
Figure 13:
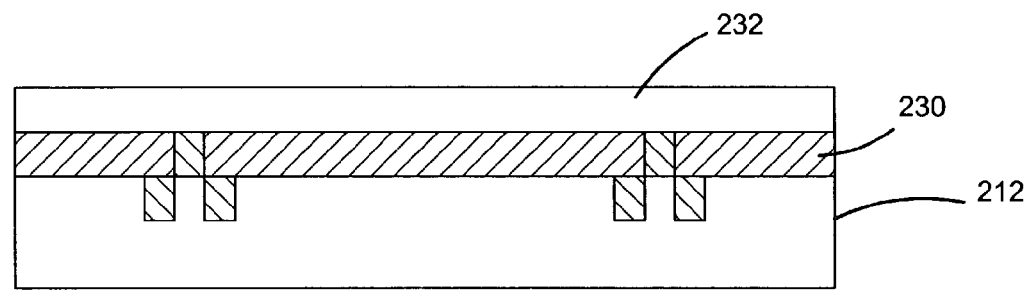
Figure 14:
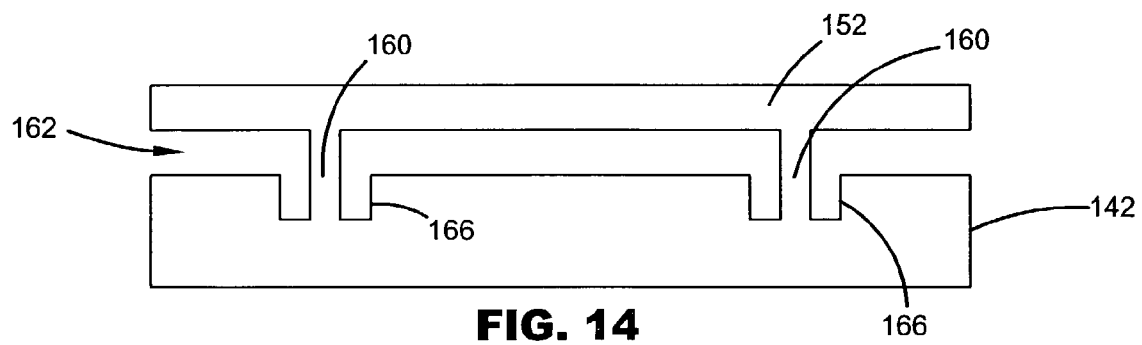

Thereafter, as illustrated in FIG. 10, layer 226 is deposited and patterned or etched to form the second portion 168 of the flexure body as illustrated in FIG. 11. A sacrificial layer 230 is deposited over the surface and the surface is planarized as illustrated in FIG. 12. The transducer body or layers 232 are deposited on the sacrificial layer 230 using known transducer deposition or fabrication techniques. The sacrificial material 230 between the wafer 212 and the transducer body 232 and the sacrificial material in trenches 220 is etched to form flexure body 160 and the suspended or floating transducer body 152 as described which is fabricated using wafer fabrication techniques in combination with fabrication of the transducer portion of the head as illustrated in FIG. 14.

In one embodiment, sacrificial layers can be germanium, or germanium-rich SiGe. The transducer body 232 includes an alumina $Al_2O_3$ base coat or electrically insulating material and transducer layers as used in standard read-write transducer fabrication processes. In one embodiment, layer 226 can be formed of an alumina material which is planarized using CMP. The wafer is diced into slider bars prior to etching the sacrificial layer 230 and air bearing surfaces for an air bearing slider are formed using known fabricating techniques. In one embodiment, gap 162 is approximately a micron and the transducer body 152 is 40 microns. Alternatively, the flexure body or portions can be formed by etching portions of the sacrificial layer prior to depositing the transducer body and application is not limited to the illustrated steps of FIGS. 6–14.

Figure 15:
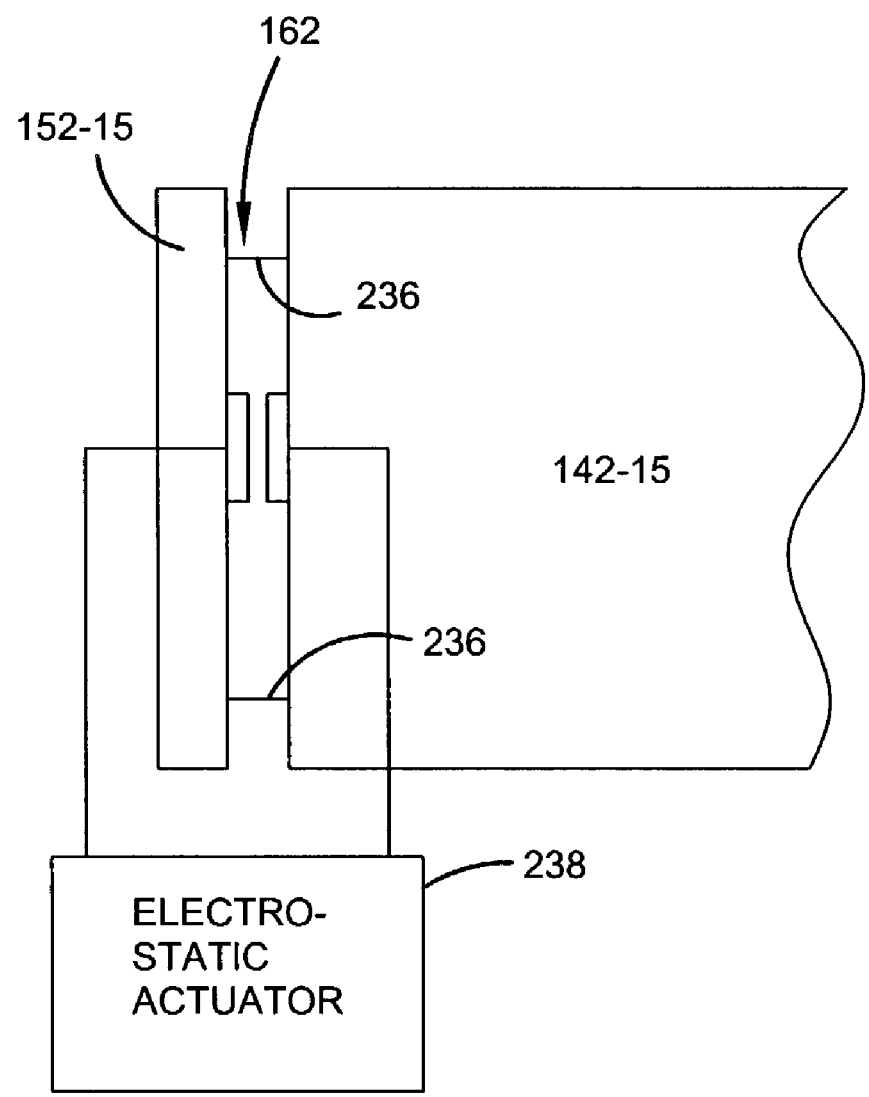
FIG. 15 is a schematic illustration of a head including a slider body and a transducer body having an electrostatic actuator in a gap therebetween to provide micro-positioning control.
Figure 16:
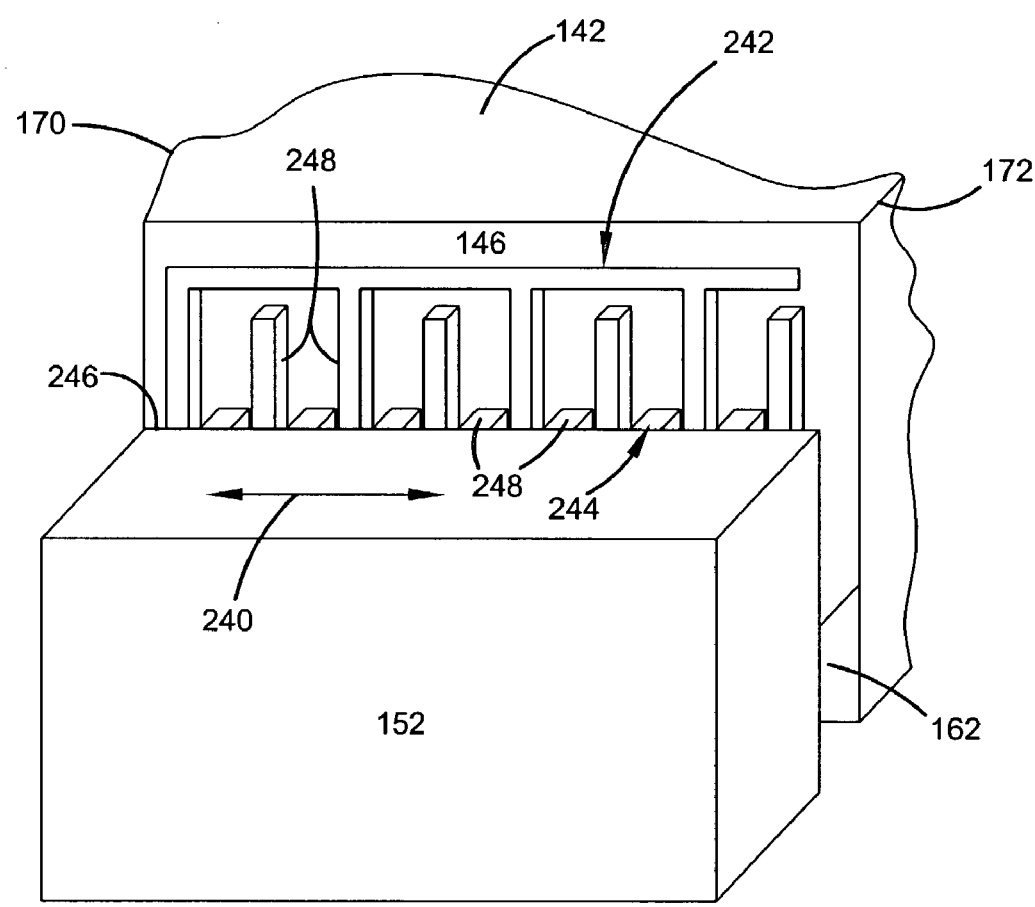
FIGS. 16–18 schematically illustrate an embodiment of a head having off-track position control in a gap between a slider body and a transducer body.
Figure 17:
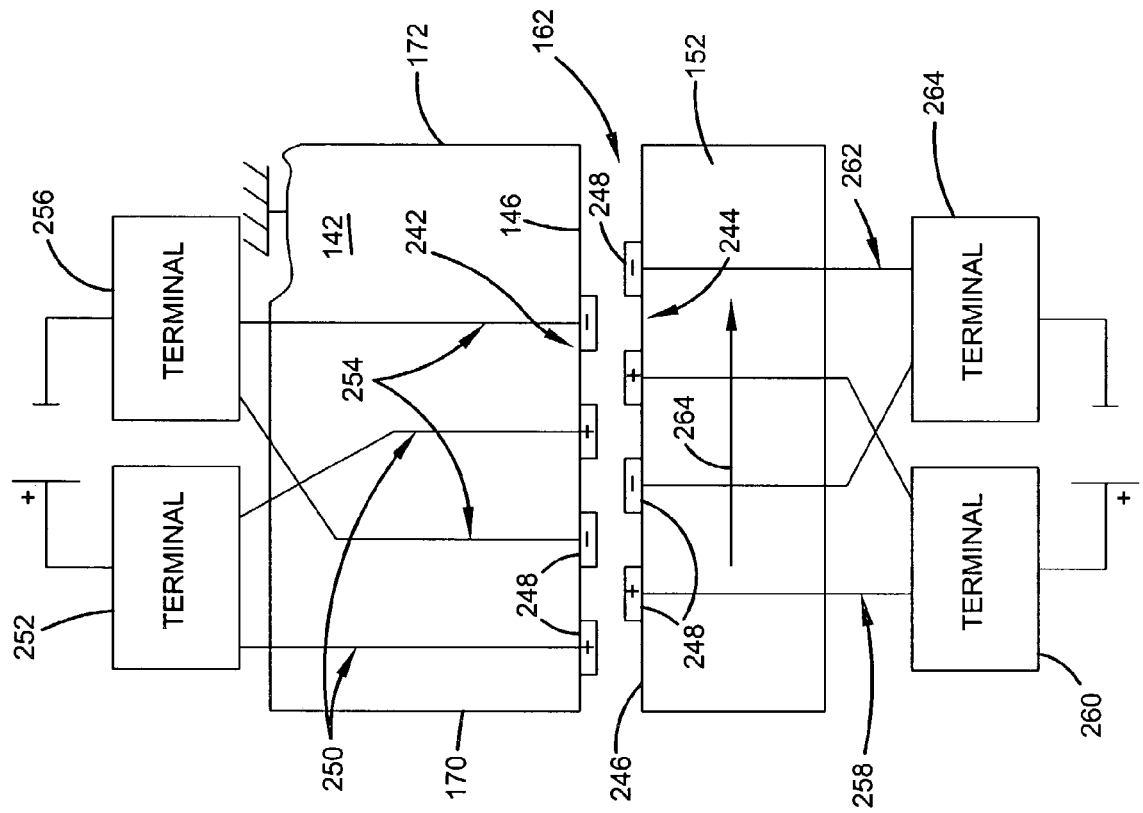
Figure 18:
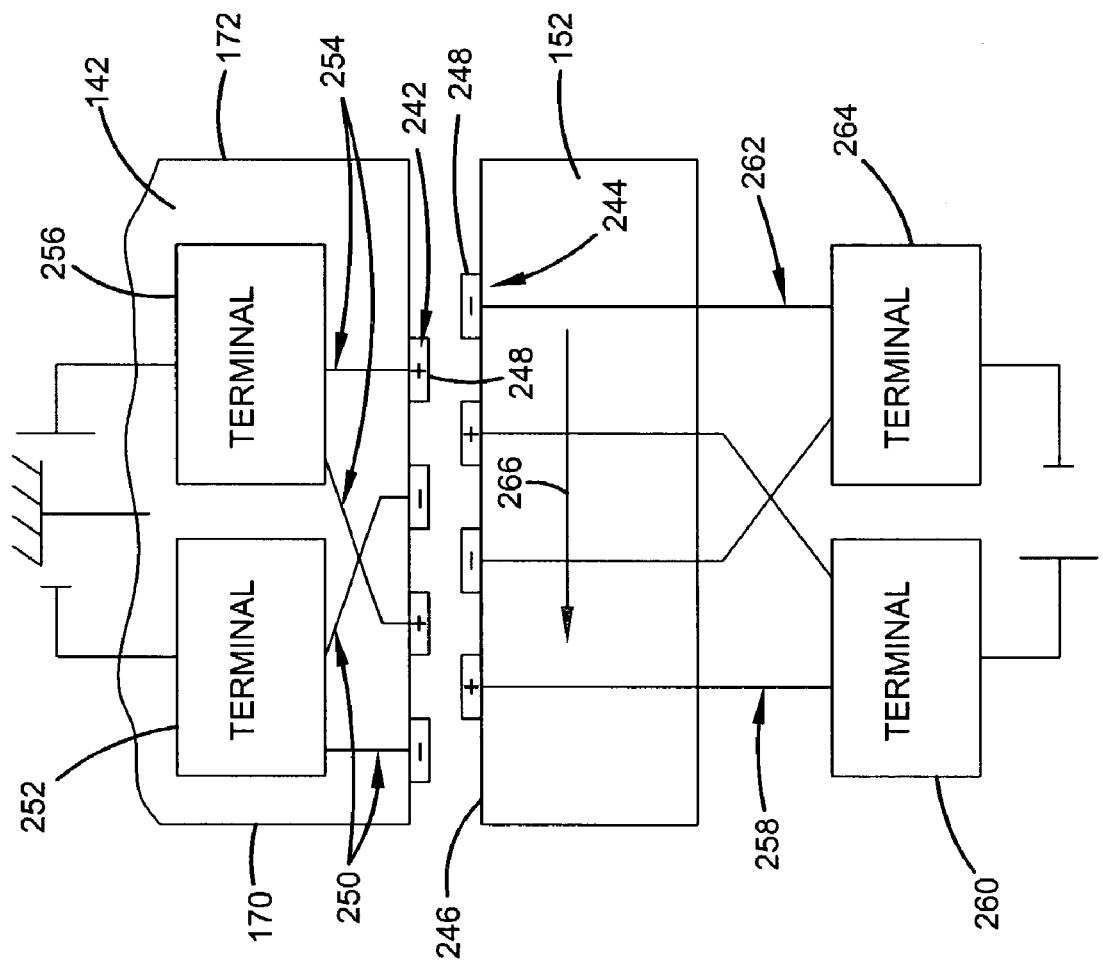

FIG. 15 illustrates an embodiment of floating transducer body 152-15 flexible coupled to a slider body 142-15 through a flexible interface 236 illustrated schematically. In the illustrated embodiment, an electrostatic actuator 238 is formed in the gap 162 and is energizable to provide the transducer level micro-positioning control. FIGS. 16–18 illustrate an embodiment of an electrostatic actuator formed in the gap 162 to provide micro-positioning control in the off-track direction as illustrated by arrow 240 for track-following. As shown, the slider body 142 includes a static electrode assembly 242 formed on the trailing edge 146 of the slider body 142 and the transducer body 152 includes a dynamic or movable electrode assembly 244 on a leading edge 246 of the transducer body 152. The electrode assemblies 242, 244 are energized to micro-position the transducer body 152 in the off-track direction as illustrated by arrow 240.

The electrode assemblies 242, 244 as shown include a plurality of electrode fingers 248 having an elongated length extending along a trailing edge 146 surface of the slider body and an elongated length extending along the leading edge 246 surface of the transducer body. As illustrated in FIG. 16, the elongated length of the electrode fingers 248 for the electrode assemblies 242, 244 is orientated between opposed surfaces of the slider body and transducer body to provide off-track micro-positioning.

In the illustrated embodiment of FIGS. 17–18, the static electrode assembly 242 on the slider body 142 includes a first electrode comb 250 coupled to terminal 252 and a second electrode comb 254 coupled to terminal 256. The dynamic electrode assembly 244 on the transducer body 152 includes a first electrode comb 258 coupled to terminal 260 and a second electrode comb 262 coupled to terminal 264. The electrode combs 250, 254, 258, 262 each include a plurality of conductively coupled fingers 248 orientated as previously shown. Fingers 248 of the static comb 250 are interspersed with the fingers 248 of static comb 254 and the fingers 248 of dynamic comb 258 are interspersed with the fingers of dynamic comb 262. The fingers 248 of the static combs 250, 254 are offset from the fingers 248 of the dynamic combs 258, 262.

As illustrated in FIGS. 17–18, a voltage potential is supplied across terminals 252, 256, 260, 262 of the static and dynamic electrode assemblies 242, 244 to provide off-track positioning depending upon the polarity of the voltage potential. As illustrated in FIG. 17, the electrode combs are energized so that positive static fingers of comb 250 are offset in a 264 direction from negative electrode fingers of dynamic comb 262 and negative static electrode fingers of comb 254 are offset in the 264 direction from positive electrode fingers of dynamic comb 258 and in an opposed direction, the offset electrodes have similar polarity to provide actuation in the 264 direction.

Alternatively, as illustrated in FIG. 18, the electrode combs are energized so that negative static electrode fingers of comb 250 are offset in a 266 direction from the positive electrode fingers of dynamic comb 258 and positive static electrode fingers of comb 254 are offset from negative electrode fingers of dynamic comb 262 in the 266 direction and as shown in the opposed direction 264, the offset electrodes have similar polarity to provide actuation in the 266 direction. Thus, as described, the static and dynamic electrode assemblies 242, 244 provide a relatively thin structure which is disposed in the gap 162 to provide micro-positioning control for off-track head positioning. In the illustrated embodiments, microactuation may be obtained by applying a fixed voltage to dynamic electrode combs 258, 262 and a variable voltage potential to static electrode combs 250, 254 to control the direction and magnitude of the displacement or vice versa.

Figure 19:
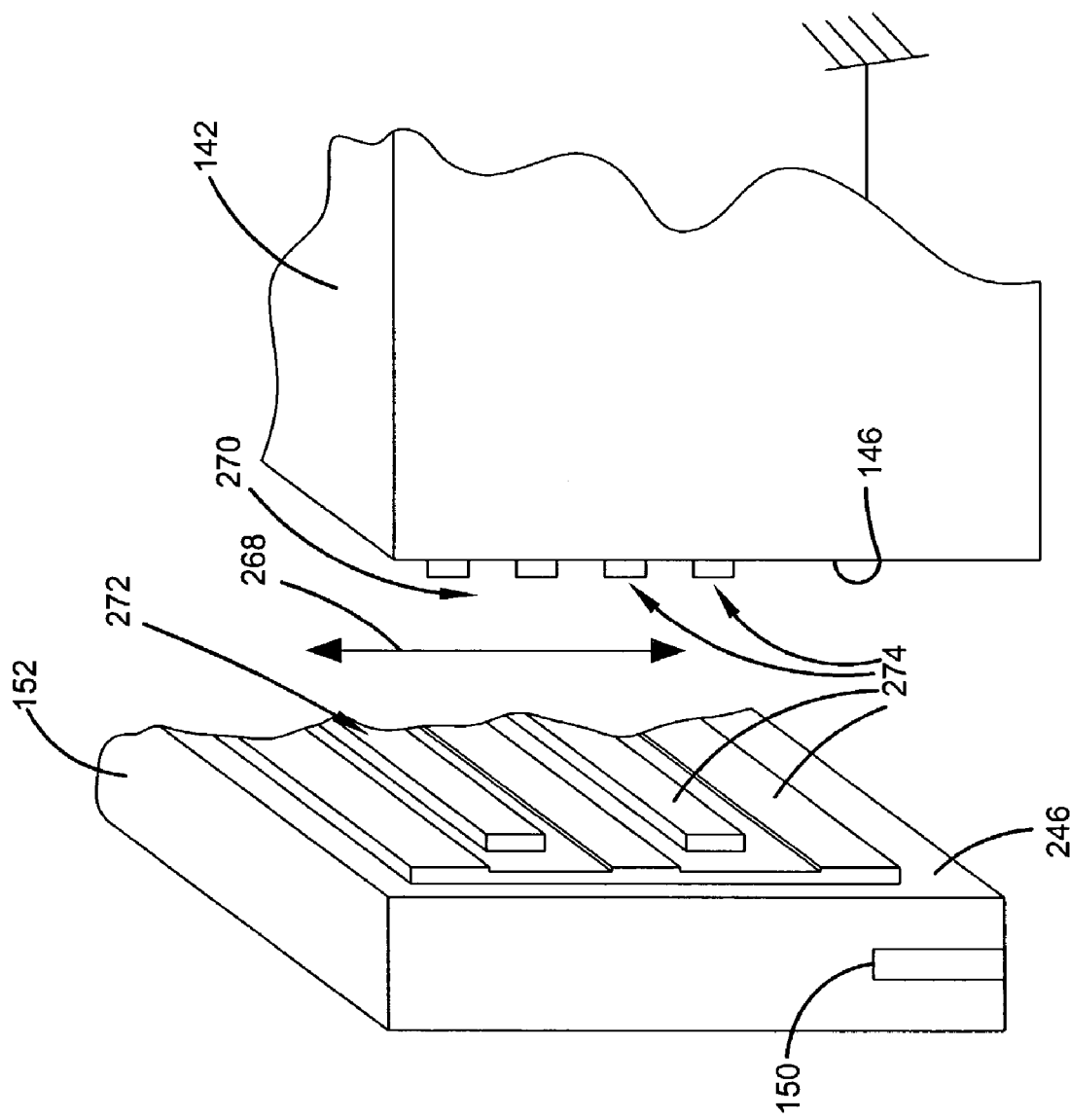
FIGS. 19–21 schematically illustrate an embodiment of a head having fly height position control in a gap between a slider body and a transducer body.
Figure 20:
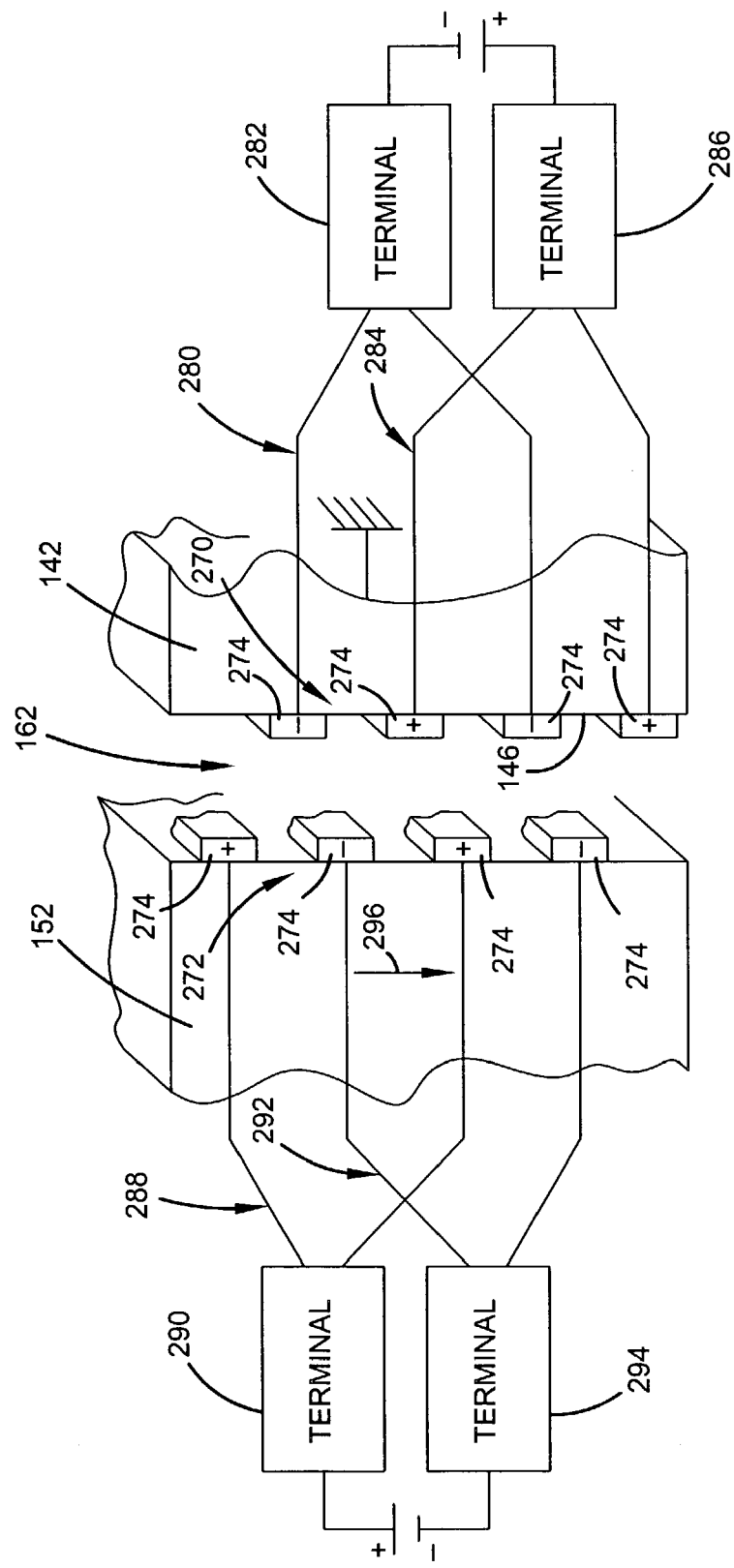
Figure 21:
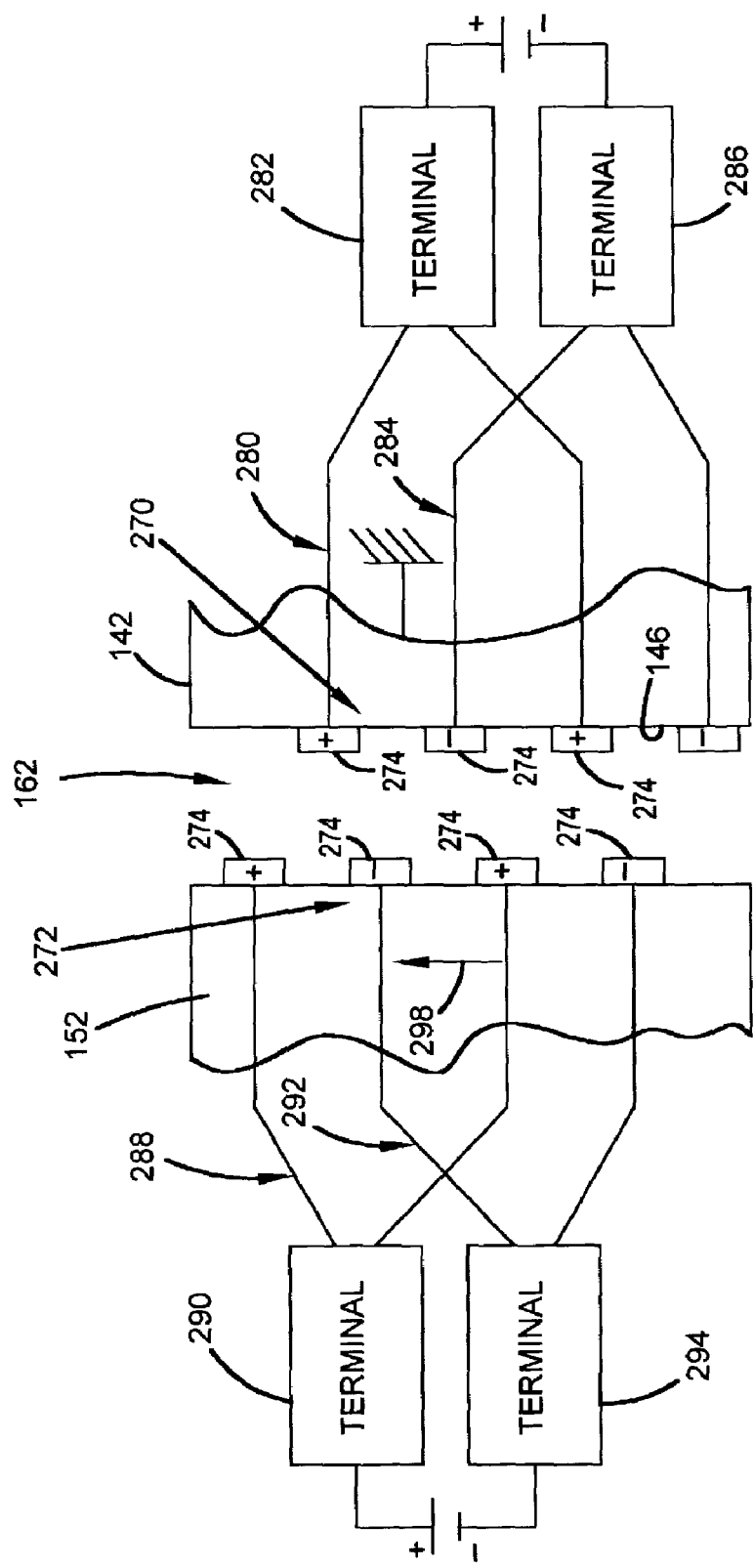
Figure 22:
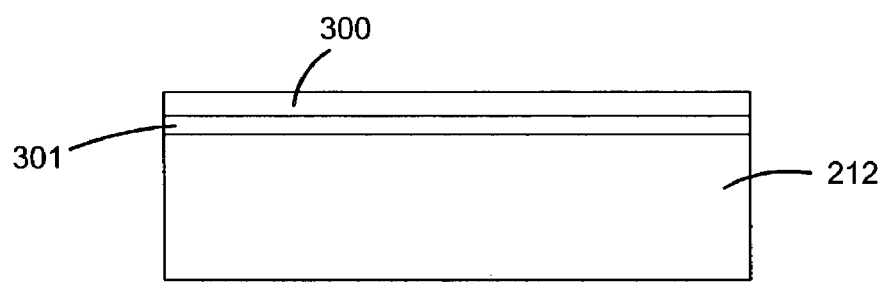
FIGS. 22–28 progressively illustrate a fabrication embodiment for an electrostatic interface including electrodes on a slider body and electrodes on a transducer body.
Figure 23:
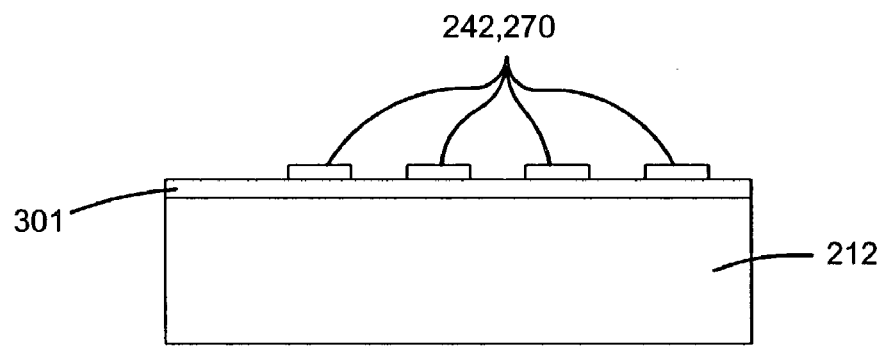

FIGS. 19–21 illustrate an embodiment of an electrostatic actuator formed in the gap 162 to provide micro-positioning control in the fly height or disc-spacing direction as illustrated by arrow 268. As shown, the slider body 142 includes a static electrode assembly 270 formed on the trailing edge 146 surface of the slider body 142 and the transducer body 152 includes a dynamic or movable electrode assembly 272 on the leading edge 246 surface of the transducer body 152. The electrode assemblies 270, 272 are energized to provide micro-positioning in the fly height direction as illustrated by arrow 268.

As shown, the electrode assemblies 270, 272 include a plurality of electrode fingers 274 having an elongated length extending along the trailing edge surface 146 of the slider body and an elongated length extending along the leading edge 246 surface of the transducer body. As illustrated in FIG. 19, the elongated length of the electrode fingers 274 for the electrode assemblies 270, 272 is orientated between opposed sides of the slider body and transducer body to provide fly height micro-positioning.

In the illustrated embodiment of FIGS. 20–21, the static electrode assembly 270 includes a first electrode comb 280 coupled to terminal 282 and a second electrode comb 284 coupled to terminal 286. The dynamic electrode assembly 272 on the transducer body 152 includes a first electrode comb 288 coupled to terminal 290 and a second electrode comb 292 coupled to terminal 294. As shown, the first and second electrode combs 280, 284 on the slider body 142 each include a plurality of conductively coupled fingers 274 having an elongated length extending along the trailing edge surface of the slider body 142 between opposed sides of the slider body 142.

The dynamic electrode combs 288, 292 each include a plurality of conductively coupled fingers 274 having an elongated length extending along the leading edge surface 246 of the transducer body between opposed sides thereof. Fingers 274 of the static comb 280 are interspersed with the fingers 274 of static comb 284 and the fingers 248 of dynamic comb 288 are interspersed with the fingers 274 of dynamic comb 292 and the fingers 274 of the static combs 280, 284 are offset from the fingers 274 of the dynamic combs 288, 292.

As illustrated in FIGS. 20–21, a voltage potential is supplied across terminals 282, 286, 290, 294 of the static and dynamic electrode assemblies 270, 272 to provide actuation in the fly height direction depending upon the polarity of the voltage potential. As illustrated in FIG. 20, the electrode combs are energized so that positive static electrode fingers of comb 284 are offset in a 296 direction from negative electrode fingers of dynamic comb 292 and negative static electrode fingers of comb 280 are offset in the 296 actuation direction from positive electrode fingers of dynamic comb 288 and in the opposed actuation direction, the offset electrodes have similar polarity to provide actuation in the 296 direction.

Alternatively, as illustrated in FIG. 21, the electrode combs are energized so that negative static electrode fingers of comb 284 are offset from positive electrode fingers of dynamic comb 288 and positive static electrode fingers of comb 280 are offset from negative fingers of dynamic comb 292 in a 298 actuation direction and in the opposed direction, the offset electrodes have similar polarity to provide actuation in the 298 direction. Thus, as described, the static and dynamic comb assemblies provide a relatively thin structure which is disposed in the gap 162 to provide micro-positioning control for fly height control. In the illustrated embodiments, microactuation may be obtained by applying a fixed voltage potential to dynamic electrode assemblies 288, 292 and applying a variable potential to static electrode assemblies 280, 284 to control the direction and magnitude of displacement or vice versa.

Figure 24:
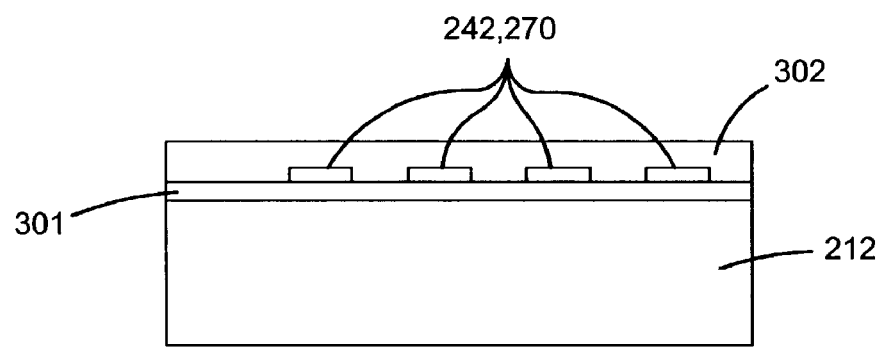

The electrostatic electrodes on the slider body and the transducer body can be fabricated at the wafer level for wafer fabrication as illustrated with reference to FIGS. 22–28. As progressively shown in FIGS. 22–23, static electrodes or pattern are etched from conductive electrode layer 300 deposited on insulating layer 301. The insulating layer 301 provides electrical isolation for the electrodes from the substrate and each other. In one embodiment, the insulating layer 301 can include a LPCVD silicon nitride layer, such as $Si_3N_4$ and the electrode layer can be a sputtered tantalum. Sacrificial gap layer 302, such as sputtered germanium is deposited and planarized as shown in FIG. 24.

Figure 25:
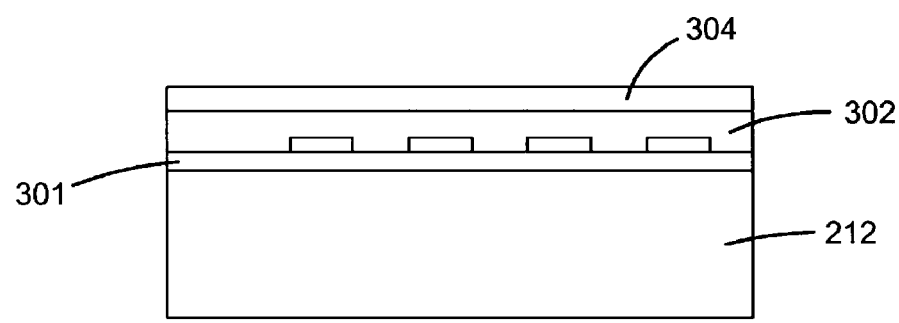
Figure 26:
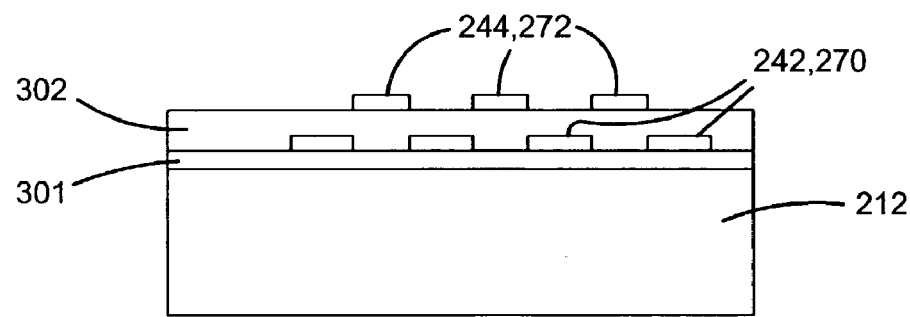
Figure 27:
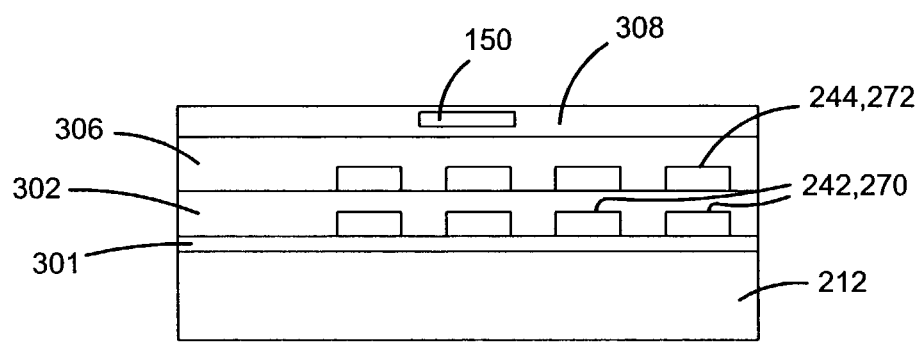
Figure 28:
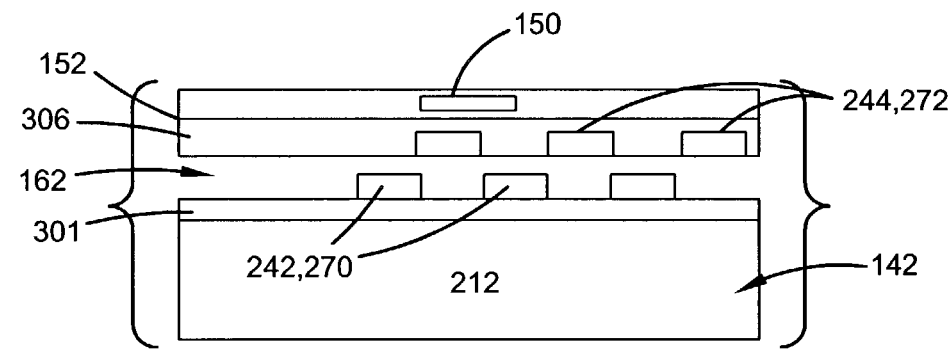

A second electrode assembly or pattern is etched from a second conductive electrode layer 304, such as tantalum as progressively illustrated in FIGS. 25–26. An e-beam cured photoresist mask could be used to ionmill the electrode material to form the patterned electroded assemblies and a plasma ash photomask used after milling. A transducer body layer 306 is deposited over the electrode pattern 244, 272 and planarized as illustrated in FIG. 27 as previously described. Transducer layers 308 including transducer elements 150 are deposited on the body layer 306 in accordance with known transducer fabrication techniques and the bars are sliced and the sacrificial gap layer 302 is etched to form the electrodes and gap 162 therebetween as illustrated in FIG. 28. Thus, as described, transducer elements 150 and electrodes 244, 272 are supported on the floating transducer body 152 and electrode 242, 270 are formed on the slider body to provide micro-positioning control as described.

Figure 29:
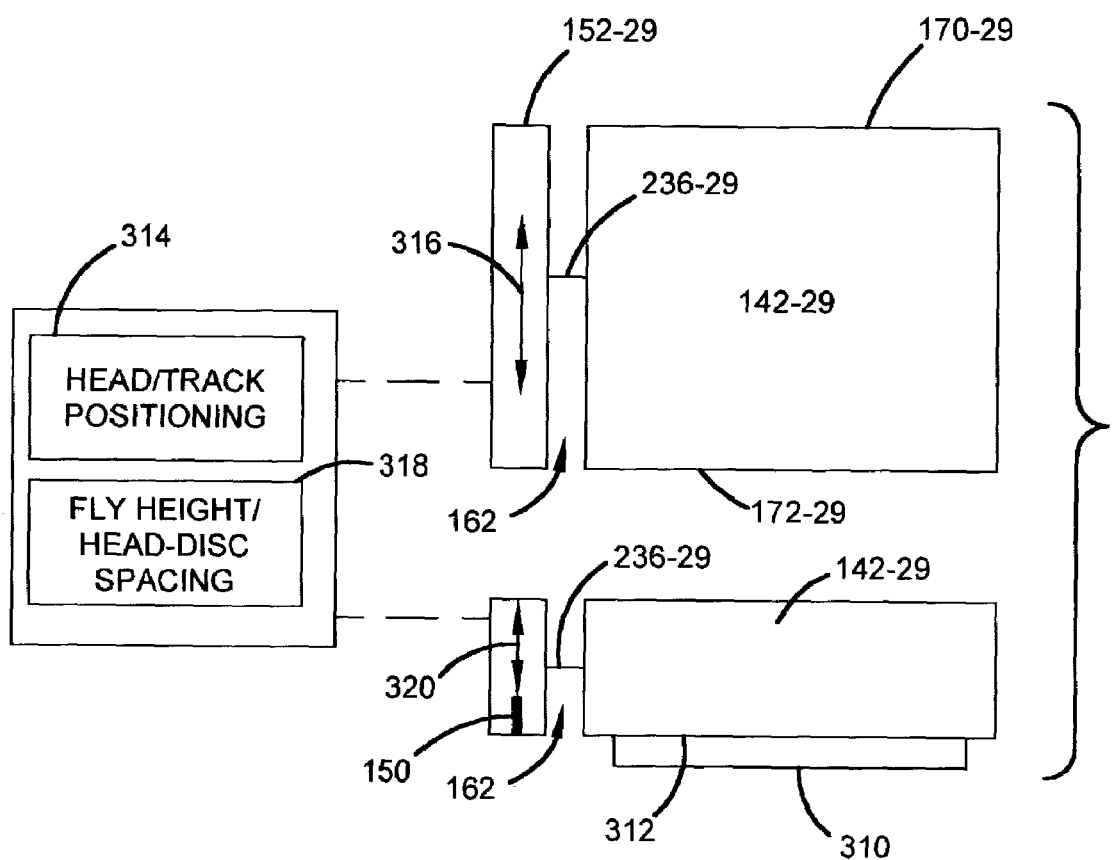
FIG. 29 schematically illustrates an embodiment of a head having off-track and fly height micro-positioning control.

FIG. 29 schematically illustrates an embodiment of a head having multi-directional transducer level micro-positioning. As illustrated, the head includes a transducer body 152-29 coupled to a slider body 142-29 through a flexible interface 236-29 in gap 162 between the slider body 142-29 and the transducer body 152-29. As shown, the head includes a raised bearing surface 310 and a recessed bearing surface 312 on the slider body illustrated schematically to form an air bearing slider for proximity or near proximity recording. As shown the air bearing slider or head includes off-track positioning control 314 as illustrated by arrow 316 and fly height micro-positioning control 318 as illustrated by arrow 320 for fly height control.

Figure 30:
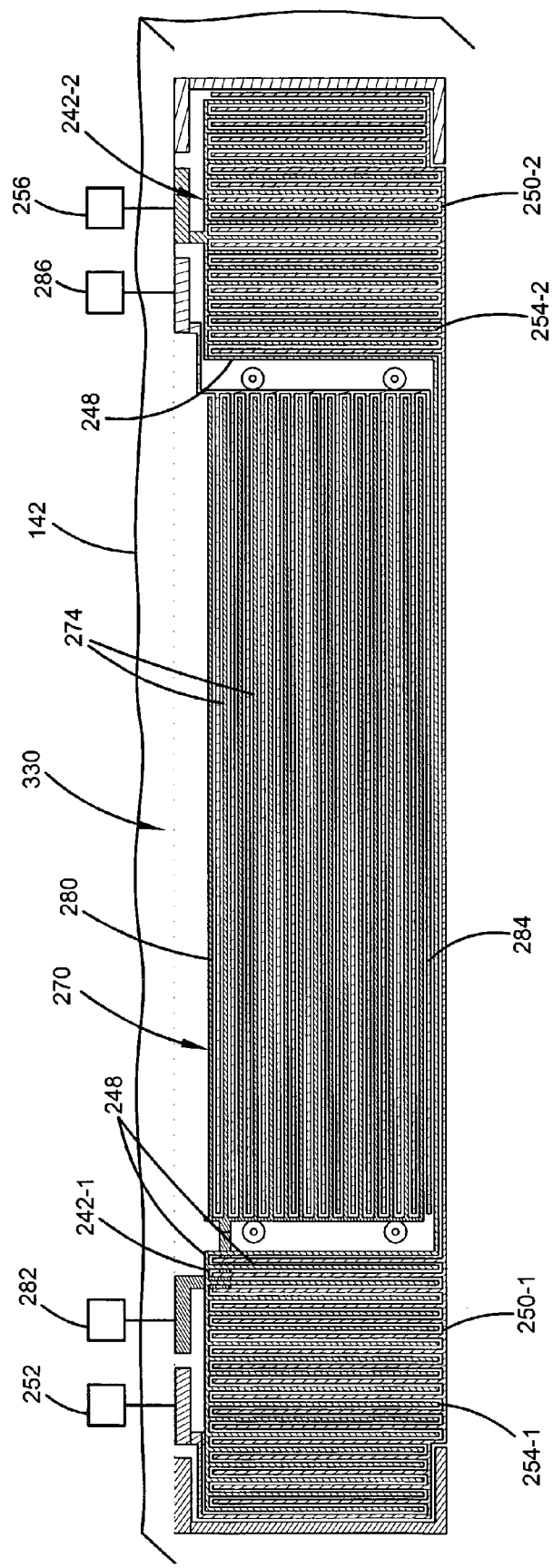
FIGS. 30–31 illustrate an electrode pattern for a head having off-track and fly height micro-positioning control in a gap between a slider body and a transducer body.
Figure 31:
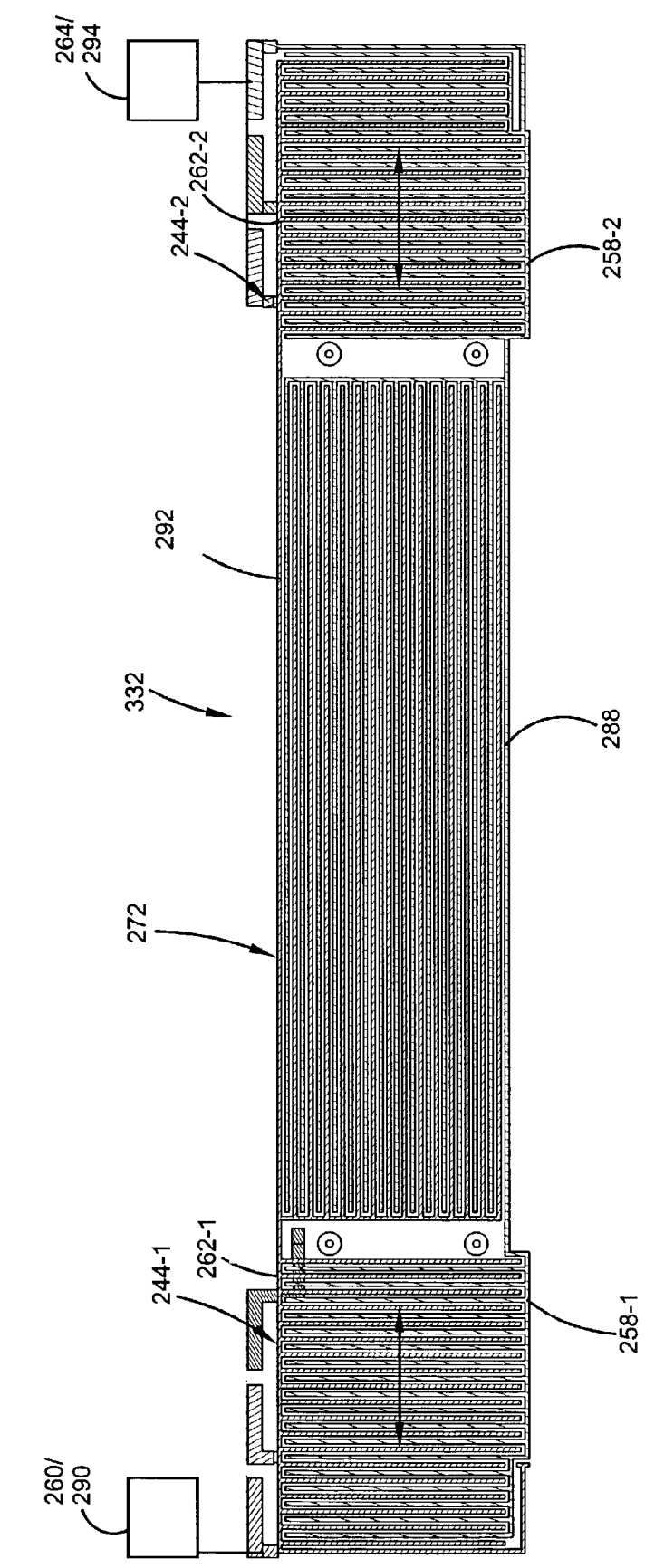

FIGS. 30–31 schematically illustrate an embodiment of an electro-static assembly for off-track and fly height positioning control disposed in a gap between the slider body and the transducer body. FIG. 30, illustrates a static electrode assembly or pattern 330 on the slider body for off-track and fly height positioning and FIG. 31 illustrates a dynamic electrode assembly or pattern 332 on the transducer body for off-track and fly height positioning. As shown assembly or pattern 330 includes electrode fingers for both off-track and fly height positioning. In particular the assembly or pattern 330 includes static fly height electrode assembly 270 including combs 280, 284 coupled to terminals 282, 286 for fly height positioning and static off-track electrode assembly 242 including combs 250, 254 coupled to terminals 252, 256. As shown, electrode assembly 242 includes multiple portions 242-1, 242-2 including opposed comb portions 250-1, 254-1, 250-1, 254-2 on opposed sides of the static fly height electrode assembly 270.

The dynamic electrode pattern 332 illustrated in FIG. 31 includes a dynamic fly height electrode assembly 272 including electrode combs 288, 292 and a dynamic off-track electrode assembly 244 including combs 258, 262. In the embodiment shown, electrode combs 258, 288 are electrically interconnected and are coupled to common terminal 2601290 and combs 262, 292 are electrically interconnected and are coupled to the common terminal 264/294 to reduce the number of electrical connections required. As shown, electrode assembly 244 includes multiple portions 244-1, 244-2 including opposed comb portions 258-1, 258-2, 262-1, 262-2 on opposed sides of the dynamic fly height electrode assembly 272.

Figure 32:
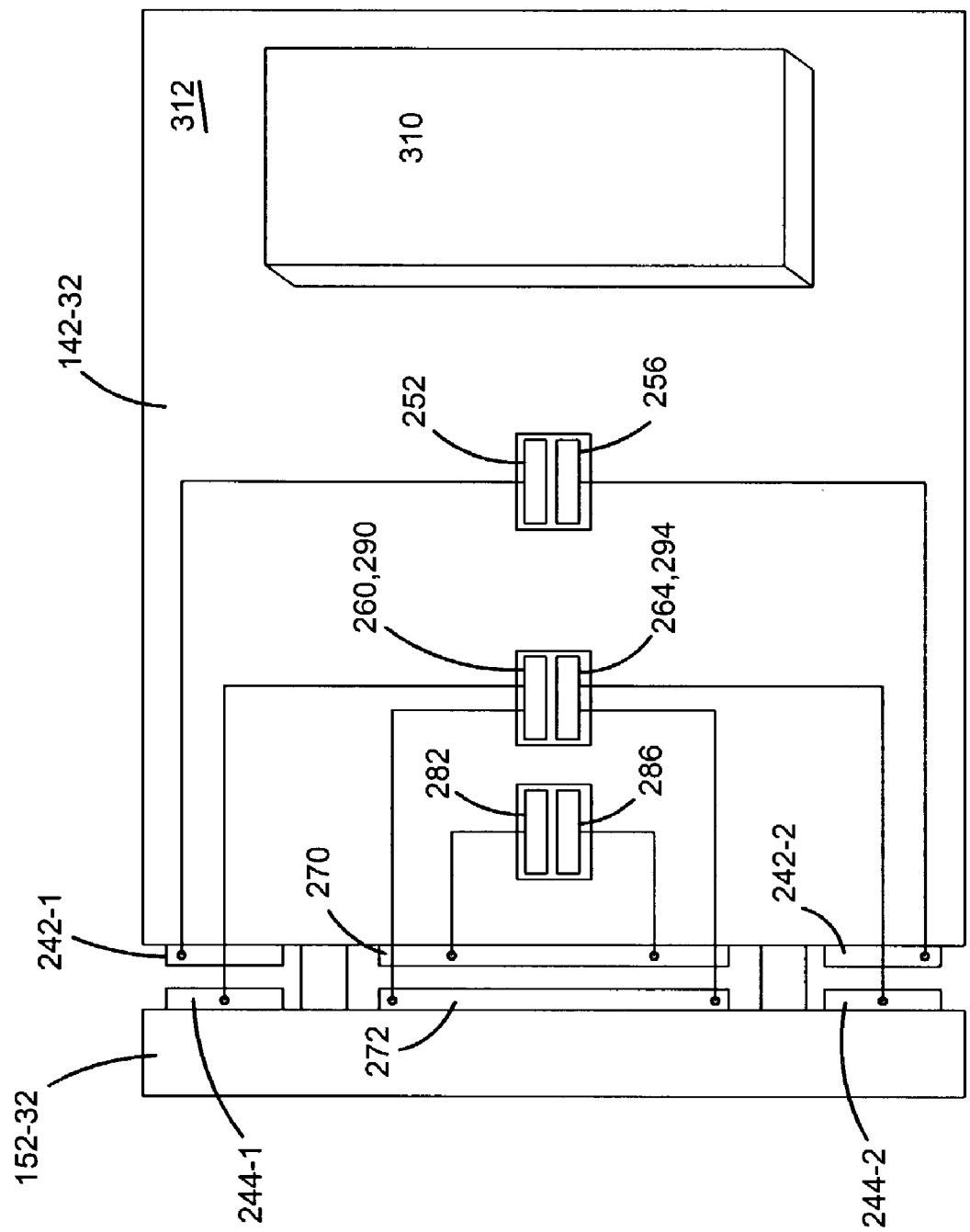
FIGS. 32–33 schematically illustrates interface embodiments of electrode assemblies or patterns for a head having off-track and fly height micro-positioning control.
Figure 33:
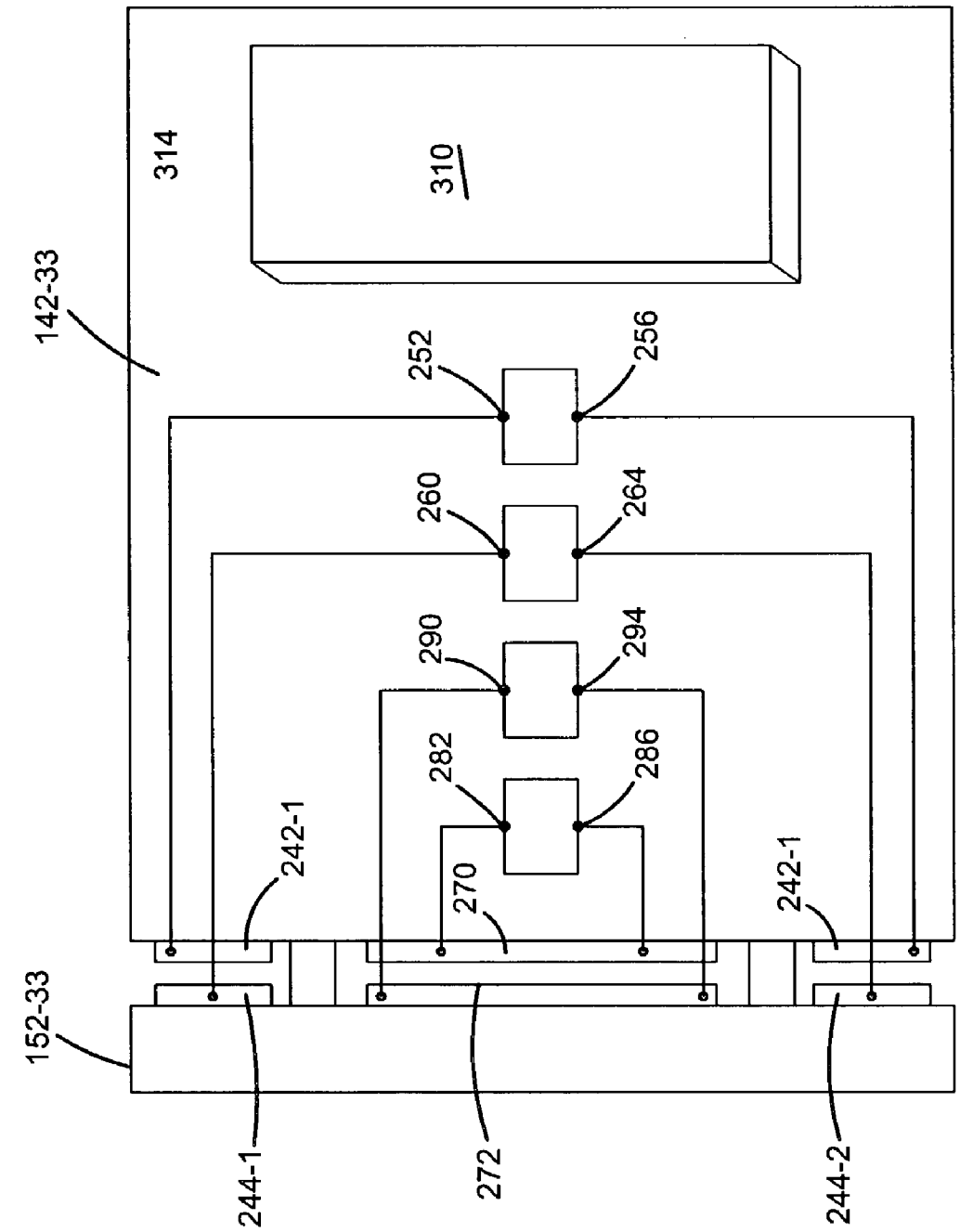

As schematically shown in FIG. 32, dynamic electrode assembles 272, 244 are energized through the common terminal 260/290 and static electrode assemblies 270 and 242 are selectively energized for fly height or off-track positioning control. Alternatively, application is not limited to the specific embodiment shown, for example dynamic electrode combs for the fly height and off-track positioning control can be separately energized requiring separate electrical connections as illustrated by terminals 260, 264, 290, 294 in FIG. 33.

Figure 34:
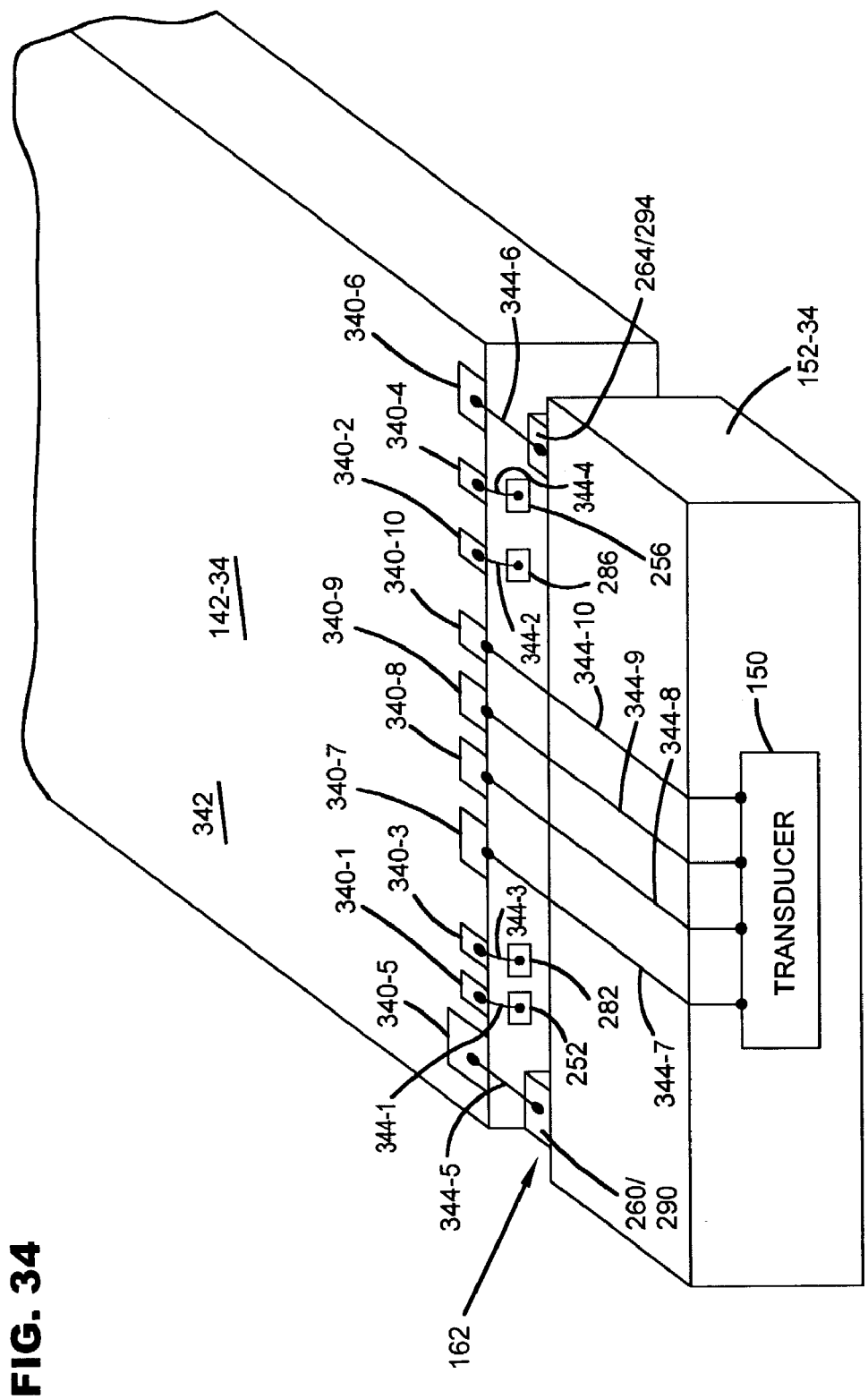
FIG. 34 schematically illustrates an electrical interface between a slider body and transducer body for an embodiment of a micro-positioning control system.

The electrodes or assemblies 242, 244, 270, 272 and transducer elements 150 are electrically connected to drive circuitry for operation. The electrical interface for the transducer elements 150 and electrodes 244, 272 must extend across gap 162. FIG. 34 illustrates an embodiment of an electrical interface for the transducer elements 150 and electrodes or assemblies 244, 272 including "flying leads" to provide an electrical connection for the transducer elements 150 and electrodes 244, 272 on the transducer body 152 to limit resistance or interference with operating dynamics of the head or transducer body. As shown, the slider body 142-34 includes terminal pads 340 on surface 342 opposed to the air bearing surface of the slider body which electrically interface with drive circuitry.

In the diagrammatically illustrated embodiment, terminal pads 340-1, 340-2, 340-3, 340-4 are conductively coupled to electrode terminals 252, 256, 282, 286 on the slider body 142-32 via leads 344-1, 344-2, 344-3, 3444 illustrated diagrammatically. Terminal pads 340-5, 340-6 are conductively coupled to electrodes terminals 260/290, 264/290 for electrodes or assembly 272, 244 on the transducer body 152 through leads 344-5, 344-6 which extend across gap 162. Terminal pads 340-7, 340-8, 340-9, 340-10 are coupled to transducer elements 150 via leads 344-7, 344-8, 344-9, 344-10 which extend across gap 162.

Figure 35:
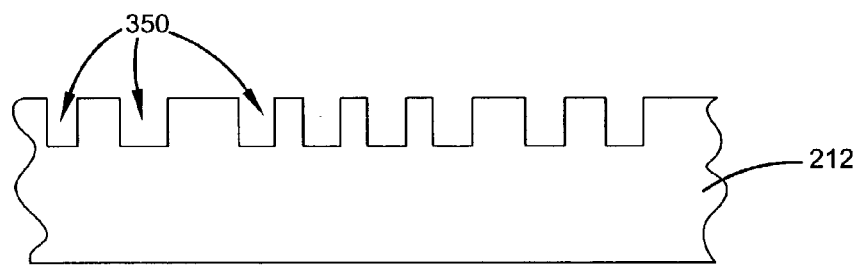
FIGS. 35–60 progressively illustrate a fabrication embodiment for an electrical interface between electrodes on a slider body and electrodes and transducer elements on a transducer body.
Figure 36:
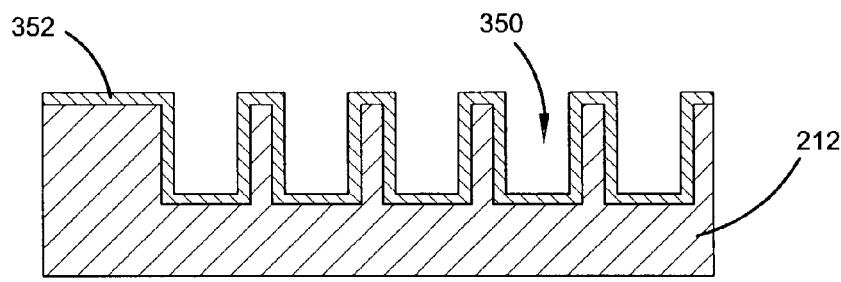
Figure 37:
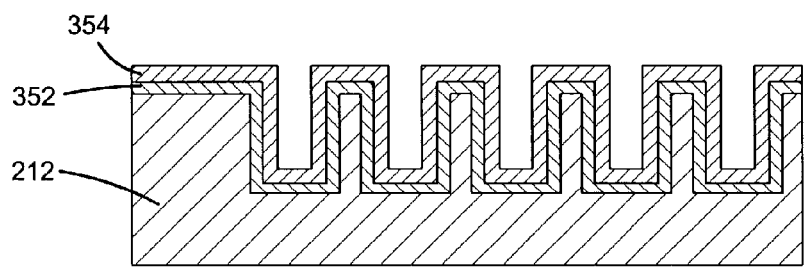
Figure 38:
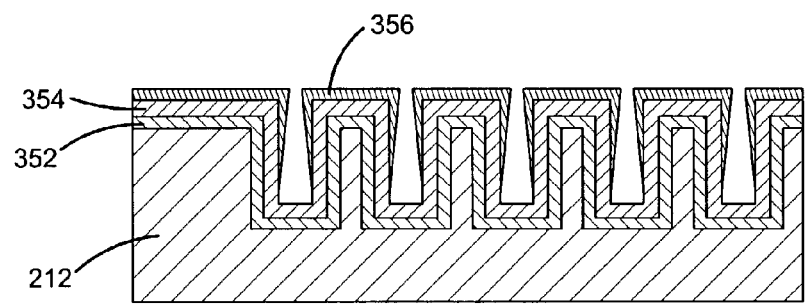
Figure 39:
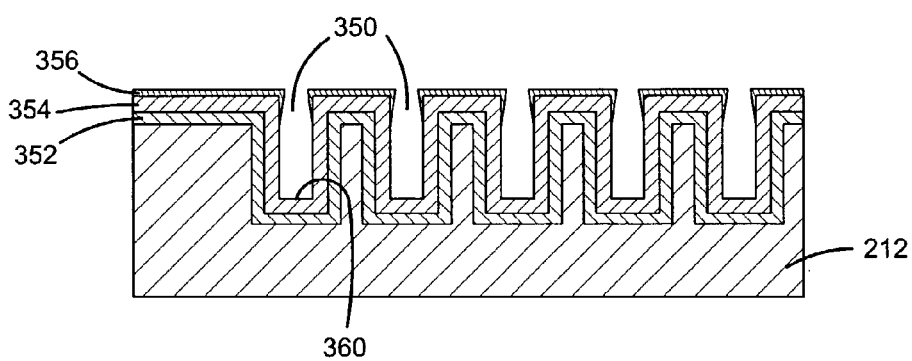

FIGS. 35–60 progressively illustrate a wafer fabrication embodiment for terminal pads 340 and leads 344. As shown in FIG. 35, terminal pad trenches 350 are etched from the wafer 212 by known deep reactive ion etching techniques. A resist or oxide mask can be used. An insulating layer 352 is deposited to insulate trenches 350 and a conductive seed layer 354 is deposited for electroplating as shown in FIGS. 36–37. In one embodiment, the insulating layer can be a silicon nitride such as LPCVD $Si_3N_4$. In one embodiment, the seed layer 354 can be tantalum or gold. As shown in FIGS. 38–39, a non-conformal insulation layer 356 is deposited to cover an exposed surface of the seed layer 354 and layer 356 is isotropically etched as shown in FIG. 39 so that the conductive surfaces 360 in the trenches 350 are exposed. A timed wet or dry etch can be used. In one embodiment, the non-conformal insulation layer can be a plasma enhanced chemical vapor deposition PECVD silicon dioxide.

Figure 40:
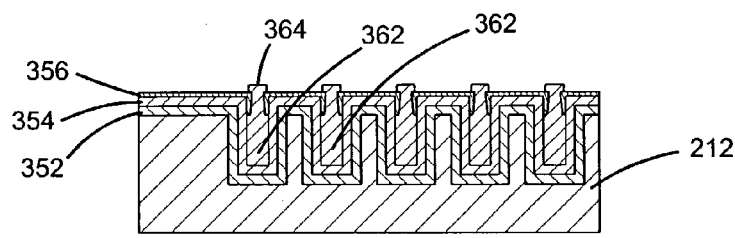
Figure 41:
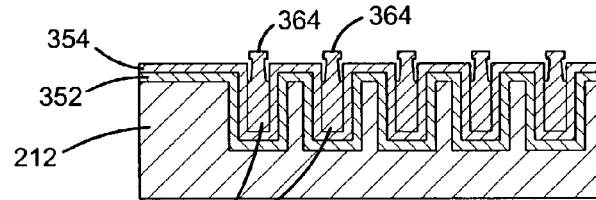
Figure 42:
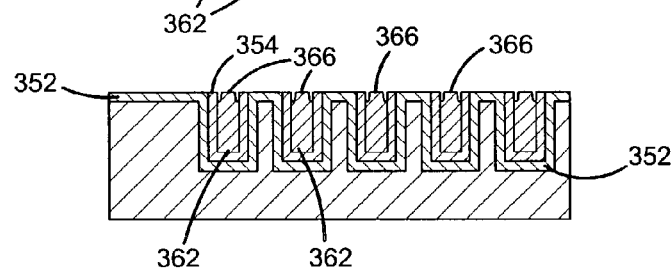

The conductive terminal pads 362 are formed in the trenches 350 by a conductive material, such as gold by an electroplating process which includes a mushroom portion 364 as shown in FIG. 40. Thereafter, the insulating layer 356 is etched using a wet or dry isotropic etch as illustrated in FIG. 41, and the surface is planarized to layer 352 as illustrated in FIG. 42 to form portion 366 at the conductive terminal pads 362. The surface may be planarized using lapping or CMP. Alternative methods of filling terminal pad trenches 350 with metal, such as electroplating directly onto seed layer 354 without adding insulating layer 356, and using MOCVD metal deposition rather than electroplating are possible.

Figure 43:
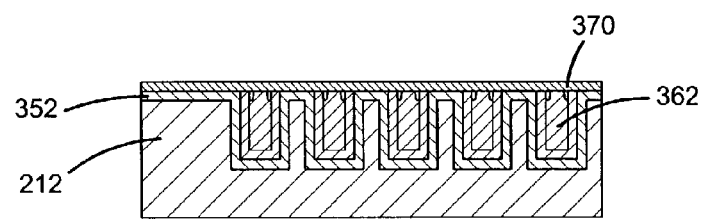
Figure 44:
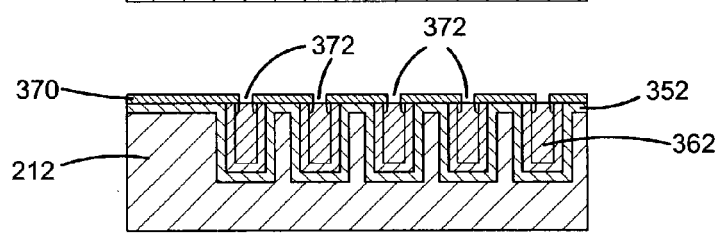
Figure 45:
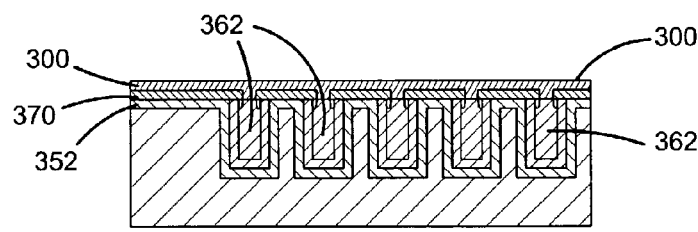
Figure 46:
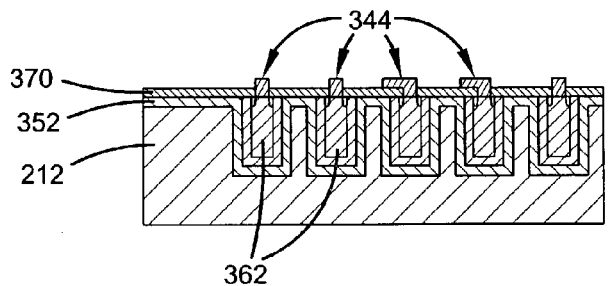

As shown in FIGS. 43–45, an insulating layer 370 is deposited as illustrated in FIG. 43 to cover the conductive terminal pad. In one embodiment, a PECVD silicon nitride can be used, such as $Si_3N_4$. Lead openings 372 are etched through the insulating layer 370 to terminal pads 362 as illustrated in FIG. 44 using standard photolithography and dry-etching. An electrode layer 300, as described previously, is deposited and fills openings 372 to the conductive terminal pads 362 as shown in FIG. 45. In one embodiment openings are "over-filled" to provide a flat surface for lithography. In the illustrated embodiment, the electrode layer 300 is etched to form the static electrode pattern (not shown), as previously described, and the leads 344 from the terminal pads 362 as shown in FIG. 46. An e-beam cured photoresist mask could be used to allow ion milling of the electrode material and a plasma ash photomask is used after milling.

Figure 47:
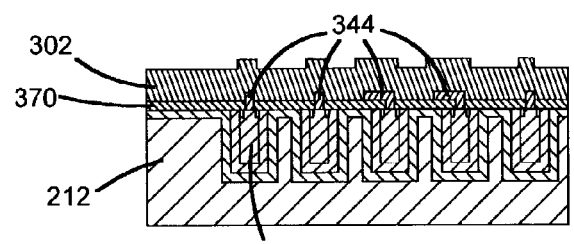
Figure 48:
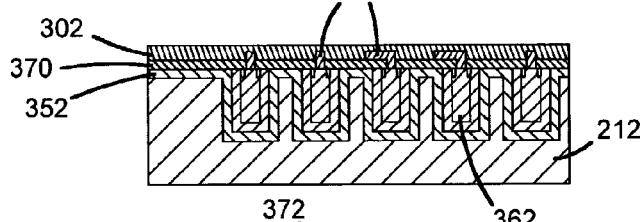
Figure 49:
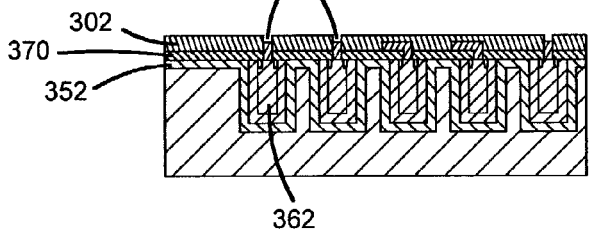
Figure 50:
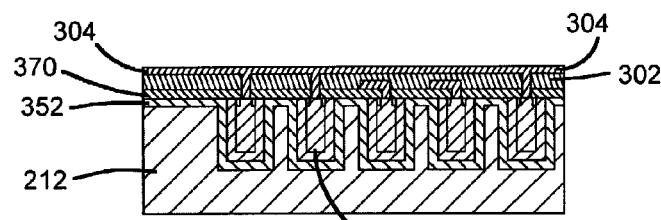
Figure 51:
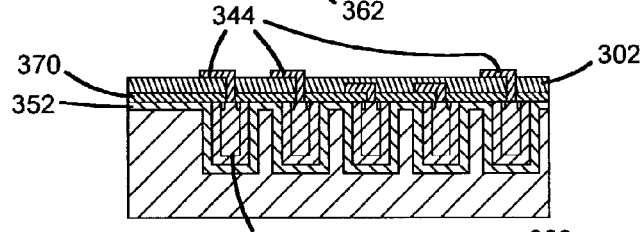

The sacrificial gap layer 302, as previously described, is deposited and planarized as illustrated in FIGS. 47–48. Prior to depositing the sacrificial layer, an opening to trench 220 can be etched through the insulation layers to expose a top of the flexure body using standard photolithography and dry etching. Patterned lead openings or spaces 372 for leads 344 through the gap 162 to the transducer body 152 are etched in the sacrificial gap layer 302 as shown in FIG. 49 while leads 344-1, 344-2 etc. electrically connect to the static electrodes etched from the electrode layer 300 as shown in FIG. 34. An electrode layer 304 is deposited in lead spaces 372. For example, a sputtered tantalum layer of approximately 0.25 µm thick is deposited, as shown in FIG. 50. The layer 304 is patterned to form dynamic electrodes 244, 272, as previously described (not shown), and leads 344 for the electrodes on the transducer body, as shown in FIG. 51.

Figure 52:
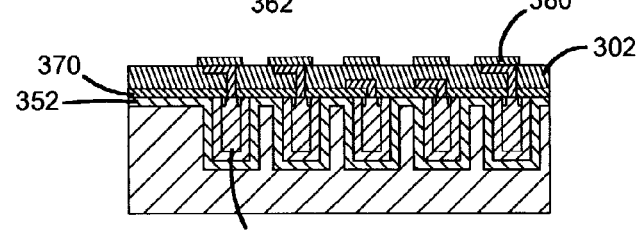
Figure 53:
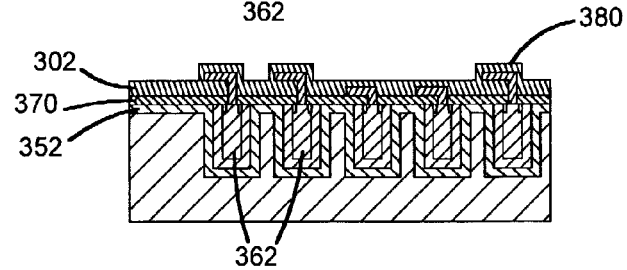
Figure 54:
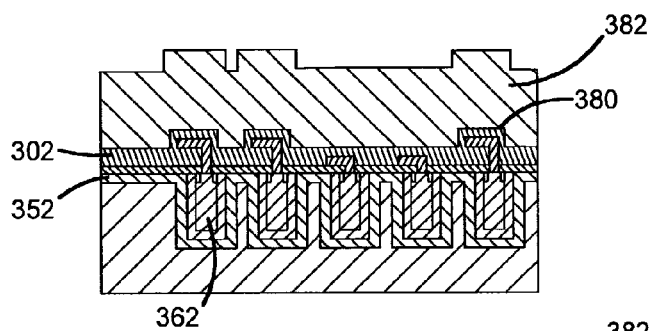
Figure 55:
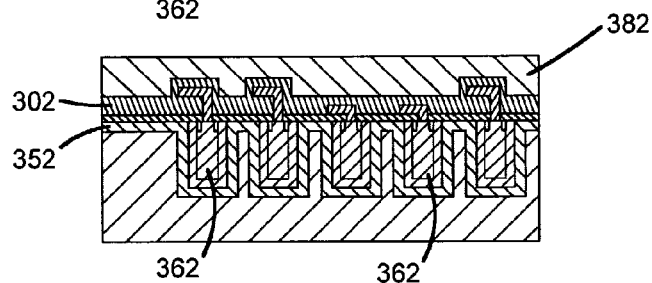
Figure 56:
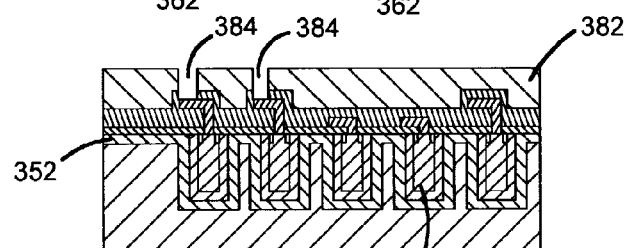
Figure 57:
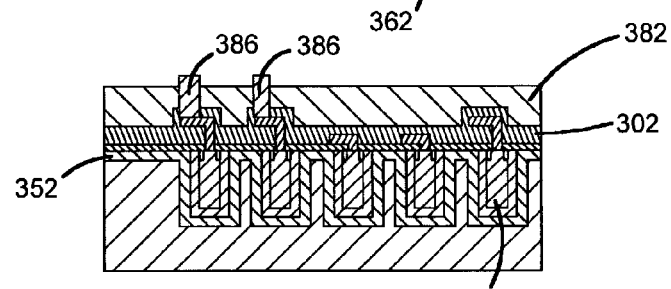
Figure 58:
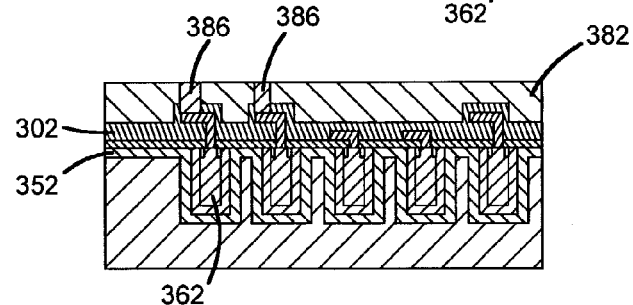
Figure 59:
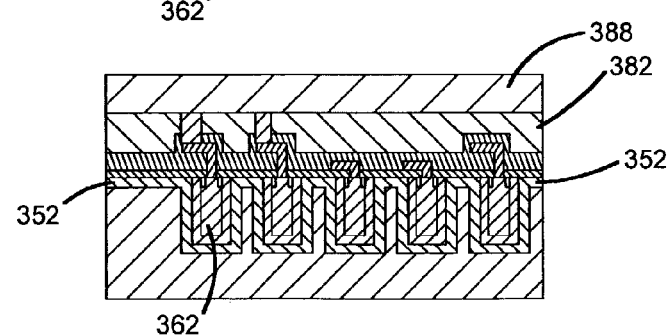
Figure 60:
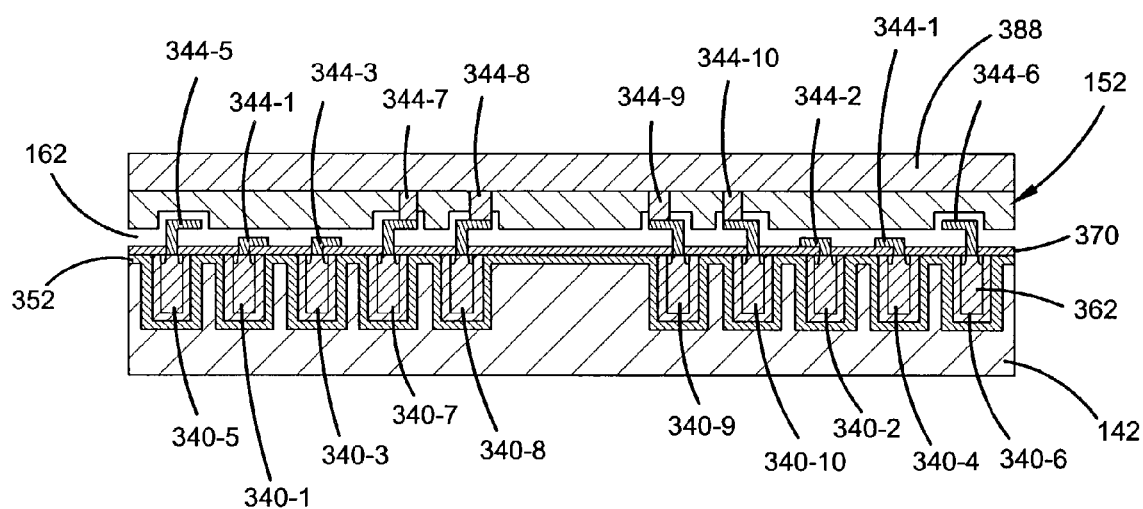

As shown in FIG. 52, a sacrificial layer 380, such as sputtered germanium is deposited and patterned etched to form the flying lead gap for the transducer leads. The sacrificial layer 380 is patterned using standard photolithography and a timed dry etch. As shown in FIGS. 54–55, a body layer 382, such as alumina is deposited and planarized. In one embodiment, prior to depositing the body layer 382 an opening is etched through the sacrificial layer 380 using standard photolithography and dry etching to deposit or form the second portion of the flexure body and transducer body formed for example of an alumina material. The opening should be etched slightly below the silicon or wafer surface to increase attachment area for the flexure body. As shown in FIG. 56, lead openings or spaces 384 for the transducer lead are etched through the body layer 382. The lead openings or spaces 384 are filled with a Thereafter, the transducer layers 388 are deposited as illustrated in FIG. 59 and the wafer is sliced into bars (not shown) to form air bearing surfaces on the slider bar for an air bearing slider. The sacrificial layer 302 is etched as previously described and shown in FIG. 60 to form the floating transducer body and leads extending to electrodes on the transducer body and transducer elements on the transducer body. A lapping step may be employed to lap the terminal pads of the slider bar. A germanium film layer for the sacrificial layer can be etched using a hydrogen peroxide.

The present invention relates to a head having micro-positioning control. The head includes a slider body (such as 142) and a transducer body (such as 152) coupled to the slider body through a flexible interface or body (such as 160, 236). The transducer body (such as 152) is spaced from the slider body (such as 142) to form a gap (such as 162) therebetween. Micro-positioning actuators (such as 154, 238, 314, 318) are coupled to the transducer body in the gap (such as 162) to provide micro-positioning control. In an embodiment for an air bearing slider, the gap includes off-track and fly height positioning control (such as 314, 318).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a particular data storage device, it will be appreciated by those skilled invention. In addition, although the preferred embodiment described herein is directed to a particular data storage device, it will be appreciated by those skilled in the art that the teachings of the present invention can be applied to other storage devices, without departing from the scope and spirit of the present invention.

What is claimed is:

1. A head comprising:
   a slider body having a leading edge, a trailing edge, and an air bearing surface;
   a transducer body spaced from the trailing edge of the slider body to form a gap between the trailing edge of the slider body and the transducer body and the transducer body including at least one transducer element;
   at least one flexure body in the gap between the trailing edge of the slider body and the transducer body; and
   a first actuator energizable to micro-position the transducer body in a first off-track direction relative to the slider body and a second actuator energizable to micro-position the transducer body in a second direction towards or away from a data storage surface.

2. The head of claim 1 wherein the first and second actuators are formed in the gap between the slider body and the transducer body.

3. A head comprising:
   a slider body having a leading edge, a trailing edge, and an air bearing surface;
   a transducer body spaced from the trailing edge of the slider body to form a gap between the trailing edge of the slider body and the transducer body and the transducer body including at least one transducer element;
   a flexible connecting member in the gap between the slider body and the transducer body;
   a micro positioning actuator in the gap between the slider body and the transducer body including an electrode comb on the slider body including a plurality of elongated fingers having an elongated finger length extending along a trailing edge surface of the slider body and an electrode comb on the transducer body including a plurality of elongated fingers having an elongated finger length extending along a leading edge surface of the transducer body.

4. The head of claim 3 wherein the micro-positioning actuator includes first and second electrode combs on the slider body and first and second electrode combs on the transducer body and the fingers of the first and second electrode combs on the slider body are interspersed along the trailing edge surface of the slider body and the fingers of the first and second electrode combs on the transducer body are interspersed along the leading edge surface of the transducer body and the fingers of the first and second electrode combs on the transducer body are offset from the fingers of the first and second electrode combs on the slider body.

5. The head of claim 4 wherein the first electrode comb on the slider body is coupled to a first terminal and the second electrode comb on the slider body is coupled to a second terminal and the first electrode comb on the transducer body is coupled to a third terminal and the second electrode comb on the transducer body is coupled to a fourth terminal.

6. The head of claim 3 wherein the finger length of the electrode comb on the slider body extends generally vertically and the finger length of the electrode comb on the transducer body extends generally vertically to provide actuation in an off-track direction.

7. The head of claim 3 wherein the finger length of the electrode comb on the slider body extends generally horizontally and the finger length of the electrode comb on the transducer body extends generally horizontally to provide actuation in a direction towards or away from a disc surface.

8. The head of claim 3 including a plurality of micro-positioning actuators in the gap including a first actuator including first and second electrode combs on the slider body orientated in a first direction and first and second electrode combs on the transducer body orientated in the first direction and a second actuator including first and second electrode combs on the slider body orientated in a second direction and first and second electrode combs on the transducer body orientated in the second direction.

9. The head of claim 8 wherein the first and second electrode combs on the transducer body and the slider body of the first actuator include first and second electrode comb portions and the first and second combs of the second actuator on the transducer body and the slider body are positioned between the first and second comb portions of the first actuator.

10. A head comprising:
    a slider body having a leading edge and a trailing edge;

a transducer body spaced from the trailing edge of the slider body to form a gap between the trailing edge of the slider body and the transducer body and the transducer body including at least one transducer element; and at least one connecting member in the gap between the slider body and the transducer body compliantly connecting the transducer body to the slider body to move in a generally horizontal direction relative to the slider body and in a direction generally towards or away from a data storage surface.

11. The head of claim 10 and further comprising a micro-positioning actuator in the gap between the slider body and the transducer body and energizable to move the transducer body in one of the generally horizontal direction or towards or away from the data storage surface.

12. The head of claim 11 wherein the micro-positioning actuator includes an electro-static comb on the trailing edge of the slider body including at least one electrode finger coupled to a first terminal and at least one electro-static comb on the transducer body including at least one electrode finger coupled to a second terminal.

13. The head of claim 12 wherein the trailing edge of the slider body includes a first electrode finger coupled to the first terminal and a second electrode finger coupled to a third terminal.

14. The head of claim 11 wherein the micro-positioning actuator includes an electrostatic comb on the trailing edge of the slider body including at least one generally horizontally aligned electrode finger and at least one generally vertically aligned electrode finger and an electrostatic comb on the transducer body including at least one generally horizontally aligned electrode finger and at least one generally vertically aligned electrode finger.

15. The head of claim 14 wherein the micro-positioning actuator includes a plurality of generally vertically aligned electrode fingers on opposed sides of the generally horizontally aligned electrode fingers.

16. The head of claim 11 wherein the micro-positioning actuator is energizable to laterally move the transducer body in the off-track direction.

17. The head of claim 11 and further comprising a plurality of micro-positioning actuators in the gap between the slider body and the transducer body including a first micro-positioning actuator to laterally move the transducer body in an off-track direction and a second micro-positioning actuator to move the transducer body in a direction to increase or decrease head-disc spacing.

18. The head of claim 17 wherein the plurality of micro-positioning actuators are electrostatic actuators including a static electrode assembly on the trailing edge of the slider body and a movable electrode assembly on a leading edge of the transducer body.

19. A head comprising
a slider body having a leading edge and a trailing edge;
a transducer body spaced from the trailing edge of the slider body to form a gap between the trailing edge of the slider body and the transducer body and the transducer body including at least one transducer element; and
at least one connecting member in the gap between the slider body and the transducer body connecting the transducer body to the slider body and the at least one connecting member compliantly connecting the transducer body to the slider body such that the transducer body is movable in at least three directions relative to the slider body.

20. The head of claim 19 wherein the at least three directions include an off-track direction and a direction towards or away from a data storage surface.

21. The head of claim 20 wherein the slider body and the transducer body include electrode combs including at least one horizontally aligned electrode finger and at least one vertically aligned electrode finger.

* * * * *